US006871137B2

(12) United States Patent
Scaer et al.

(10) Patent No.: US 6,871,137 B2
(45) Date of Patent: Mar. 22, 2005

(54) INTELLIGENT ROAD AND RAIL INFORMATION SYSTEMS AND METHODS

(75) Inventors: Robert M. Scaer, Mechanicsburg, PA (US); Jonathan Pollack, Harrisburg, PA (US); Paul W. Allred, Jr., Yorktown, VA (US)

(73) Assignee: Gannett Fleming, Inc., Camp Hill, PA (US)

( * ) Notice: Subject to any disclaimer, the term of this patent is extended or adjusted under 35 U.S.C. 154(b) by 0 days.

(21) Appl. No.: 10/772,517

(22) Filed: Feb. 5, 2004

(65) Prior Publication Data

US 2004/0243299 A1 Dec. 2, 2004

Related U.S. Application Data

(60) Provisional application No. 60/445,282, filed on Feb. 5, 2003.

(51) Int. Cl.[7] ........................... G01C 21/26; G06F 13/00
(52) U.S. Cl. ........................ 701/200; 700/216; 709/219
(58) Field of Search .............................. 701/1, 213, 36, 701/200, 201, 204, 207, 208; 700/213, 215, 216, 232, 236; 709/217, 219, 223; 705/1, 17, 18, 26, 29, 30, 34, 35, 39, 40, 401, 404, 410

(56) References Cited

U.S. PATENT DOCUMENTS

| 5,631,827 | A | | 5/1997 | Nicholls et al. | |
|---|---|---|---|---|---|
| 5,666,493 | A | * | 9/1997 | Wojcik et al. | 705/26 |
| 5,758,329 | A | * | 5/1998 | Wojcik et al. | 705/28 |
| 5,913,210 | A | * | 6/1999 | Call | 707/4 |
| 6,161,097 | A | | 12/2000 | Glass et al. | |
| 6,463,419 | B1 | * | 10/2002 | Kluss | 705/26 |
| 6,486,899 | B1 | | 11/2002 | Bush, Jr. | |
| 6,587,827 | B1 | * | 7/2003 | Hennig et al. | 705/1 |
| 6,697,702 | B1 | * | 2/2004 | Hahn-Carlson | 700/213 |
| 2003/0009361 | A1 | | 1/2003 | Hancock et al. | |

\* cited by examiner

*Primary Examiner*—Richard M. Camby
(74) *Attorney, Agent, or Firm*—Kurt L. Ehresman; McNees Wallace & Nurick LLC

(57) ABSTRACT

The present invention is a web-based transportation decision support system and geographic information system (GIS) application that leverages intelligent transportation system (ITS) information available from federal, state, local, and commercial transportation sources. The invention provides users with detailed road and rail information about routes and infrastructure characteristics, as well as real-time information from cameras, speed sensors, construction and accident reporting systems, and GIS based weather. Additionally, the invention provides users with the immediate ability to track and report surface shipments on an extremely accurate spatial data background.

22 Claims, 21 Drawing Sheets

FIG. 9

INTELLIGENT ROAD AND RAIL INFORMATION SYSTEMS AND METHODS

CROSS-REFERENCE TO RELATED APPLICATIONS

This application claims the benefit of U.S. Provisional Application No. 60/445,282 filed Feb. 5, 2003, which application is hereby incorporated by reference.

STATEMENT REGARDING FEDERALLY SPONSORED RESEARCH OR DEVELOPMENT

This invention was made pursuant to activities undertaken pursuant to contracts with the United States Government, and the United States Government may have certain rights in this invention

BACKGROUND OF THE INVENTION

The present invention relates generally to computerized systems and methods which provide a user-friendly interface, such as an Internet browser, to permit client users to obtain real-time information about road conditions, construction, incidents, and weather that might interfere with the movement of people and goods.

Various navigational and tracking systems and methods exist which can be used in combination with interfaces such as Internet browsers to provide users with information and displays relating to geography, maps, and weather. For example, available Internet websites can provide computer users with road maps for specified geographic areas, as well as driving directions from one specified addresses to another specified address. Still other websites provide information on weather, including radar and satellite images of weather over specified geographic locations. Still other websites allow for logistic tracking of individual packages based upon package identification numbers. However, there is currently no single system or method which enables users to easily access and display all information relevant to a particular geographic location. In particular, no single system or method currently provides a single point of access to gather, organize, and graphically display detailed information concerning the surface transportation infrastructure, real-time meteorological information, incidents, real-time images, and shipment logistics as that information relates to a particular geographic location or region The need exists for a system and method that can combine a number of logistics-dependent endeavors, including but not limited to route planning, route monitoring, and vehicle tracking by commercial carriers and military operations, into a single interface. This need has been magnified by recent homeland security initiatives which reinforce that immediate access and use of intelligent transportation systems and geospatial applications are essential for effective management of all types of domestic infrastructure systems such as: telecommunications; transportation; energy; banking and finance; water supply; emergency services; health services; and government services. The ability to gather transportation and logistics-related data from different databases, rapidly display and analyze the data, and share and apply geospatial information is important because emergency and disaster management in these domains requires cooperation among a broad range of organizations operating across many jurisdictions.

The need is no less critical in the area of commercial freight and commercial transportation logistics, where competition has forced carriers to evaluate all parameters of the shipping process. Immediate access to accurate navigation information is necessary to allow planning of transportation routes, and also to provide drivers with real-time information to enable adjustments to the routes based upon congestion, real-time weather, accidents, detours, construction, incidents, and special event information to provide an accurate picture of the transportation network to ensure timely and cost-efficient delivery of goods and people.

Access to transportation infrastructure information has become a critical factor, to both the government and to commercial entities. Decision makers at all levels of public and private service need interoperability with existing systems, and aggregation of disparate data sources into one common operating environment and interface. The continuing need exists for a system that enables even untrained users to quickly combine several layers of critical data into map-like products or interfaces for use in analysis and decision-making relating to transportation of people and goods. Through the use of the open interface to the system of the preset invention, users and systems can easily access, process, and share critical transportation and logistics data from virtually anywhere in the world.

Therefore what is needed is a universal data translator to access transportation-related information from disparate data sources, convert the data into a standardized format, and display it in an internet-based transportation decision support application.

SUMMARY OF THE INVENTION

The present invention is a web-based geographic information system (GIS) and method that leverages intelligent transportation system (ITS) information from various federal, state, and local government databases, as well as from commercial databases and other information sources. The system, occasionally referred to herein as "Intelligent Road and Rail Information System" or "IRRIS" provides users with a complete one-stop transportation decision support system that gathers and displays detailed geographic and logistics information, such as road and rail information about routes and infrastructure characteristics, real-time information from cameras, speed sensors, construction and accident and incident reporting systems, and GIS based real-time weather. Additionally, IRRIS provides users with the immediate ability to track and report surface shipments and vehicle locations on an extremely accurate spatial data background, and to view map displays of geographic, meteorologic, and logistic information relating to the tracked shipment or vehicle.

In one embodiment, the present invention is a transportation decision support system for requesting, processing, and displaying transportation information and tracking information concerning surface transport of goods and personnel. The system comprises at least one server having a microprocessor and a memory storing computer program executable by the microprocessor. The computer program comprises computer instructions for presenting a web-based interface for soliciting a user request for transportation information, receiving the user request, gathering transportation information relating to the user request from transportation data sources communicably connected to the server, organizing the gathered transportation information into data layers, and displaying the data layers as a base map having data layers that can be selected and adjusted by a user to alter the displayed base map. The system further includes a tracking application residing on the at least one server, the tracking application comprising computer instructions for presenting a web-based interface for soliciting a user request for tracking information relating to in-transit shipments, gathering vehicle location information and bill of lading information from at least one logistic data source communicably connected to the server, correlating the vehicle location information and bill of lading information, organizing the correlated information into data layers, and displaying the data layers as a base map having data layers that can be selected and adjusted by a user to alter the displayed base map. The system further includes at least one client user interface in communication with the at least one server and configured to display the base maps and data layers and to permit a user to select and adjust the displayed base maps and data layers.

In another embodiment, the present invention is a method of providing transportation and tracking information to a user, the method comprising the steps of: providing a transportation decision support system for requesting, processing, and displaying transportation information and tracking information concerning surface transport of goods and personnel. The system comprises at least one server, the at least one server having a microprocessor and a memory storing computer program executable by the microprocessor. The computer program comprises computer instructions for presenting a web-based interface for soliciting a user request for transportation information, receiving the user request, gathering transportation information relating to the user request from transportation data sources communicably connected to the server, organizing the gathered transportation information into data layers, and displaying the data layers as a base map having data layers that can be selected and adjusted by a user to alter the displayed base map. The computer program further comprises a tracking application residing on the at least one server, the tracking application comprising computer instructions for presenting a web-based interface for soliciting a user request for tracking information relating to in-transit shipments, gathering vehicle location information and bill of lading information from at least one logistic data source communicably connected to the server, correlating the vehicle location information and bill of lading information, organizing the correlated information into data layers, and displaying the data layers as a base map having data layers that can be selected and adjusted by a user to alter the displayed base map. The system further comprises at least one client user interface in communication with the at least one server, the at least one client user interface being configured to display the base maps and data layers and to permit a user to select and adjust the displayed base maps and data layers. The method further comprises the steps of: presenting a web-based interface for soliciting a user request for transportation information; receiving the user request; gathering transportation information relating to the user request from transportation data sources communicably connected to the server; organizing the gathered transportation information into data layers, and displaying the data layers as a base map having data layers that can be selected and adjusted by a user to alter the displayed base map.

An advantage of the system is that it provides a simple to use Internet-based interface that allow users to request and receive a wide variety of transportation and logistics information in an easy to view map-like display, select different data layers to alter the displayed map, save, export and to print the altered maps.

Another advantage is that the system allows users to query generated map displays to add or delete data layers, and to focus on and display, both graphically and in tables and text, particular data gathered in response to the initial and subsequent request.

Additional features and advantages of the present invention will be apparent from the following descriptions and figures relating to particular embodiments of the invention that illustrate, by way of example, the principles of the invention.

BRIEF DESCRIPTION OF THE DRAWINGS

The foregoing and other features of the present invention will be more readily apparent from the following detailed description and drawings of the illustrative embodiments of the invention in which:

FIGS. 3–16 are exemplary screen displays that embody the features of the invention.

Wherever possible, the same reference numbers will be used throughout the drawings to refer to the same or like parts.

DETAILED DESCRIPTION OF THE INVENTION

Figure 1:
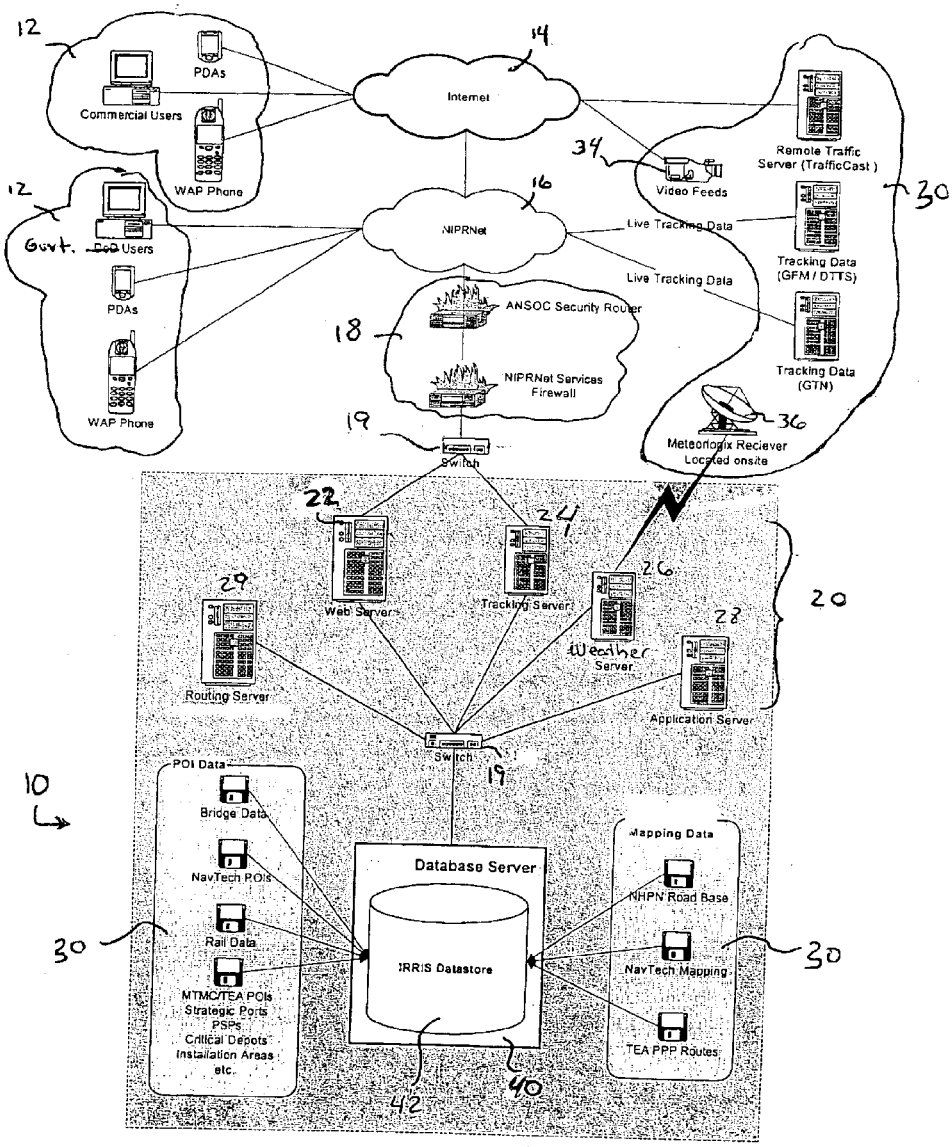
FIG. 1 illustrates a first embodiment of a system implementing various aspects of the invention.

A system and method is provided for a user to access to critical information to enable and support transportation and logistics decisions at a single Internet-based interface. Users include any persons or organizations that require access to GIS and ITS information in an easy to use format to support logistics and transportation decisions, including mapping, transportation route planning, monitoring of transportation routes and weather, accidents and other incidents affecting transportation, and tracking of vehicles. For example, military and non-military governmental users, shipping and logistics companies, emergency response personnel, and any other users who have a need for timely and accurate transportation-related information can access, display, and input data into the system to enable the making of informed transportation-related decisions. The invention provides a single point of interface for detailed surface transportation infrastructure data, real-time visualization, routing, and real-time carrier tracking of sensitive surface shipments worldwide.

The present system retrieves data from a data environment that can be internal or external to the system. For example, the source data may be a remote database accessible by server-to-server connection over a wide-area network such as the Internet. In this case, in response to a user's request submitted to the web server of the system, the web server polls one or more servers connected to data sources (such as, for example weather and traffic data gathering equipment and associated databases) to gather relevant data. The system can access and gather data from local servers and networks, as well as from remote servers and networks such as migration and legacy system databases, to obtain the relevant data. Polling and gathering of data can be accomplished by any of several means, such as by pulling data from a source system; by receiving data pushed from a source system; or by reaching back through use of direct access link, stored procedures, or various mediation technologies such as data replication between one or more database systems. The mechanisms selected for access to each data source are determined on a case-by-case basis, and selection of the appropriate method, and for proprietary data can involve the data system owners and managers. In any case, the system features, such as an internal data dictionary and metadata, eliminate the need for the user to know the source of the data necessary to respond to a user request for a selected study area. Preferably, the system automatically determines the correct sources and data relevant to a user's query, and accesses the appropriate databases and other sources for requested information. The system then organizes and processes the gathered data to create the appropriate map(s) having data layers relevant to the user's selected area of study. Alternatively, in a tracking subsystem of the present invention, the requested and polled data relate to tracking of vehicles and goods, as well as related logistics information such as shipment inventory type, location, quantity, and condition. In the tracking subsystem, the polled data can further include the location of in-transit assets (material, units, and personnel), and the status of assets in maintenance or procurement.

As shown in FIG. 1, the system 10 of the present invention includes a web server 22 having a microprocessor executing a computer program(s) including computer instructions ("software") for displaying a web-page for soliciting and accepting user requests for transportation-related information, receiving the user request and relaying it to one or more connected servers for processing, polling one or more connected data sources 30 for data relevant to the user's request, converting the data as necessary, generating a map-like display, and displaying the map-like display on a webpage of the web server for access and viewing by users on a user interface 12. The displayed information includes a combination of geographic mapping, meteorologic conditions (also referred to herein as "weather"), geospatial tracking, and other information and data relating to transportation and logistics for movement of good and people. The system 10 is designed to be adaptable for use in a wide variety of operational environments. A user may interface with the system 10 using any microprocessor-controlled device as a user interface 12 that can communicate and receive data over a wide-area network such as the Internet.

The software of the system 10 gathers and displays relevant data in easy to read graphic displays such as maps, tables, and charts that can be accessed by users through a single communications portal such as an Internet website. For example, in one embodiment, the software provides for detailed and comprehensive mapping capability using GIS and mapping technologies to generate and display high-quality mapping data as one or more basemaps, and to overlay selected data layers over the basemaps. The graphic displays include layers that can be selected and adjusted by the user, or alternatively can be automatically selected and adjusted based on rules that will cause the most relevant data layers to be displayed, yet allow the user to toggle between various layers to alter the data presented in the graphic display.

FIG. 1 illustrates one embodiment of the system of the present invention. In this embodiment, the system 10 includes features to allow restricted access, such as by authorized military or other government users, as well as open access by non-governmental users, such as by commercial transportation company users. Users access the system 10 by establishing a communications link between a user interface 12 and the system 10. User interfaces 12 can include personal computers, laptops, Personal Digital Assistants (PDA), wireless phones, or any other microprocessor controlled communications device that can establish a communications link with a computer network, such as the Internet.

In the particular embodiment of FIG. 1, commercial users access the system 10 by logging onto the Internet 14, while government users gain access by logging onto a wide area network 16, here shown as NIPRNet, a secure military-operated wide area network. It is to be understood that the particular business environment may influence the type of the communication link used to connect users to the system. Therefore, alternative types of communication links can be used, including but not limited to: an intranet network; a PAN (Personal Area Network); a LAN (Local Area Network); a WAN (Wide Area Network) or a MAN (Metropolitan Area Network); a storage area network (SAN); a frame relay connection; an Advanced Intelligent Network (AIN) connection; a synchronous optical network (SONET) connection; a digital T1, T3, E1 or E3 line connection; a Digital Data Service (DDS) connection; a DSL (Digital Subscriber Line) connection; an Ethernet connection; an ISDN (Integrated Services Digital Network) line connection; a dial-up port such as a V.90, V.34 or V.34 bis analog modem connection; a cable modem connection; an ATM (Asynchronous Transfer Mode) connection; an FDDI (Fiber Distributed Data Interface) connection; etc. The communication links may furthermore include protocols and standards used with (or that provide access to) various types of wireless communication systems, including: a WAP (Wireless Application Protocol) link; a GPRS (General Packet Radio Service) link; a GSM (Global System for Mobile Communication) link; a CDMA (Code Division Multiple Access); a TDMA (Time Division Multiple Access) link, or the like. The link or links may further operate using a variety of known network enabling code, such as Hyper text Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Perl, UNIX Shell, Visual Basic or Visual Basic Script, Virtual Reality Markup Language (VRML), and a variety of other types of protocols and/or platforms. The code or protocol deemed appropriate for use in linking user interfaces 12 to the system 10 can also depend, in part, on the technology currently being used by the user interface 12 and by data sources connected to or incorporated in the system 10.

Preferably, the communications link is a secure communications link. Security can include one or more firewalls 18 to prevent unauthorized access and to prevent infection of the system by computer viruses and the like. The firewalls 18 may include any known firewall technology, and may be supplemented by known security features such as password access, user identification and authorization techniques, and other known computer security routines. The security features can reside in the communications link, user device 12, or other components of the system 10.

As shown in FIG. 1, the system 10 is comprised of network of multiple servers 20, each server 20 dedicated to the gathering of particular transportation-related data and information from at least one data source 30. Each server 20 is communicably connected to a central database server 40, the central database server 40 having computer executable code for receiving the data from servers 20 and data sources 30, storing the data in a database 42, converting or translating the data into a format suitable for use in generating graphic displays, and generating graphic displays for visual display on a user interface 12.

In a preferred embodiment of the present invention, the central database server 40 includes data translators that accept data in the form of ED1214, EDI315, modified EDI315, ED1858, and any suitable non-standard ASCII data formats. Once the data is accepted, the data is verified, translated, scrubbed, and updated. The translators also take several different data sources and produce a single database that provides a more complete, accurate and efficient result than the stand-alone data sources.

Additionally, the central database server 40 preferably includes databases having, or direct access to databases having, transportation-related information that by its nature remains accurate without the need for frequent updates. For example, data relating to highway, bridge, waterway, and railway structures, such as width, capacity, surface composition, weight limits, geographic location, is relatively constant as compared to meteorologic data, which is by its nature transient. By way of further example, in the particular embodiment of FIG. 1, the databases of relatively permanent information include bridge data, public points of interest, rail data, government points of interest such as strategic ports, critical depots, installation (military or other government) areas, road base information, mapping, and military or other government routes. However, any databases containing GIS information can be used where the long life cycle of the data, or other features, makes direct access by the central database server 40, and storage in the central database 42, advantageous as compared to gathering of the data from other servers 20 connected to remote data gathering devices in response to a user request. In contrast, data having a short life cycle, such as real-time images from live feed cameras 34, and data from meteorologic data gathering equipment 34, is gathered from servers 20 in response to particular user requests for such data.

In the particular embodiment of FIG. 1, the architecture of the system 10 permits switching to control data flow between user interfaces 12, one or more servers 20, data sources 30, and the central database server 40. For example, the system of FIG. 1 includes a router or switch 19 that directs the flow of data requests submitted by users 12 into one of two paths. If the request relates to geographic information for a particular area, such as a request for mapping of a route from point A to point B, the request is sent by the switch 19 to the web server 22. Alternatively, if the request relates to the monitoring or tracking of a particular vehicle, such as described in the tracking subsystem of the system discussed in greater detail below, the request is sent by the switch 19 to the tracking server 24. Such use of routers or switches 19 for division of user requests facilitates efficient flow of data through the system 10 by distributing the workload among the servers.

Figure 2:
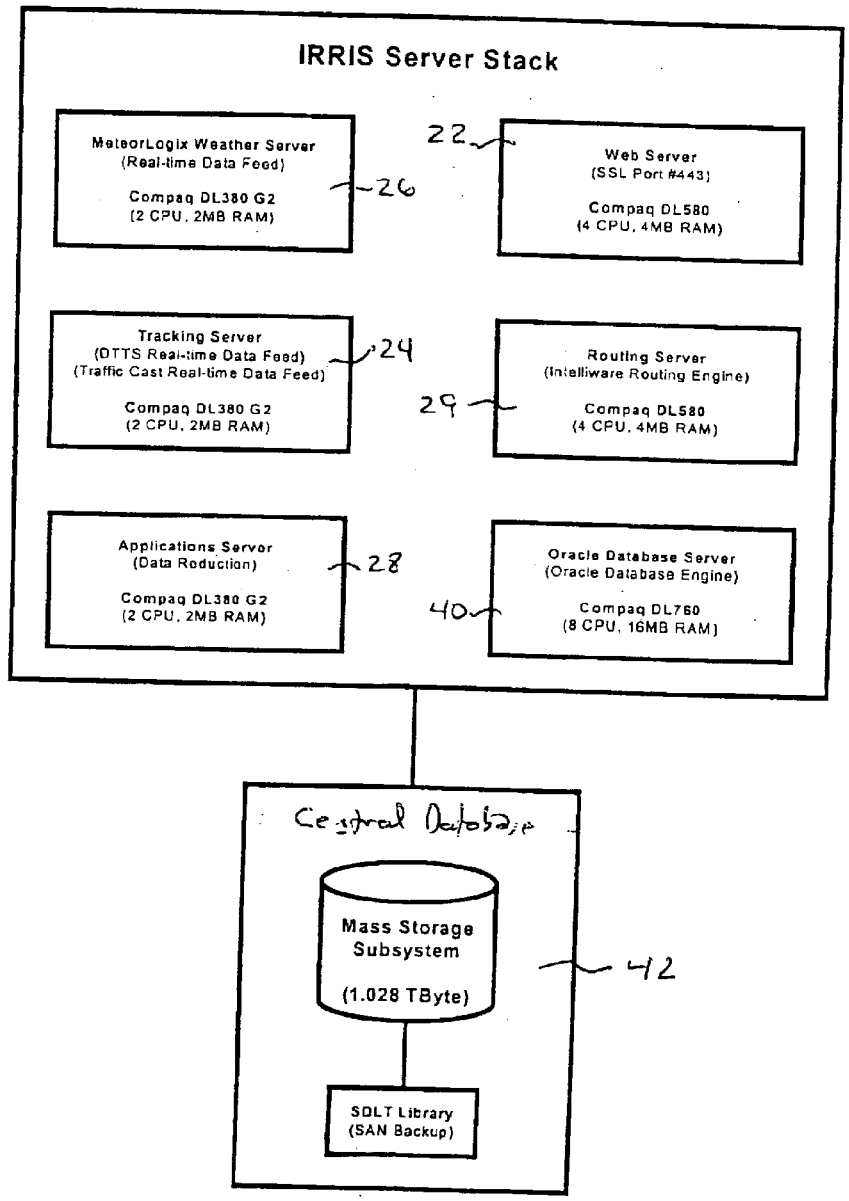
FIG. 2 illustrates an exemplary server stack in accordance with the first embodiment of FIG. 1.

FIG. 2 illustrates one particular embodiment of a suite of servers 20 in the embodiment of FIG. 1. As shown in FIG. 2, each server 20 is communicably connected to a data source geared towards particular GIS, ITS, or meteorological data. For example, the meteorological weather server 26 is communicably connected to weather-gathering equipment and databases, such as, for example Doppler radar equipment and databases. The tracking server 24 is communicably connected to GPS data sources, vehicle dispatch systems, and traffic databases. The routing server 29 is communicably connected to surface, water, and air transportation databases including traffic and congestion information. The application server 28 runs specific applications such as data conversion and formatting, and its output feeds the web server 22. In FIG. 2, exemplary system requirements are displayed for each server 20, such as processor speed and storage capacity. Those requirements are exemplary and non-limiting, and can be modified without departing from the scope or spirit of the present invention.

As shown in FIGS. 3–16, the system 10 includes software that resides on the web server 22 to receive all mapping-related user requests and data input from a user interface 12. The software of the web server 22 then brokers elements of each request to other servers 20 such as the database server 40, application server 28, weather server 26, routing server 29, and other connected servers and data sources. Specialized software/applications reside on the system 10, such as on the database server 40 and application server 28, to convert and reformat data as necessary to permit generation of map data layers for display by the web server 22. For example, the central database server 40 can include an image transformer application that operates as a Window NT service to read a list of received geographic image files, (e.g., tiff files), and transform them into an acceptable format (e.g., .png format), copy the image, and then copy the image to a specified directory on the web server 22. Additionally, for regional radar map layer generation, regional geographic images received, such as from the weather server 26, in a particular format (e.g., .cmg format) that can be converted by the software of the central database server 40 to an acceptable (e.g., .png format) and copied to a temporary directory for passing into a radar loop for display by the web server 22.

In order to submit a request for information, users must first select an area of study for graphic display. The selection, and the data retrieved and displayed in response to the user's selection, are based on a number of user-defined criteria. For example, a user may desire to generate a route map to plan a travel route from one geographic point to another, or may wish to obtain GIS information relevant to a strategic location, such as a shipping port, transportation hub, airports, or the like. The software of the system 10 allows the user to obtain all available information relevant to a particular request, preferably as a default, or to limit the information gathered and returned by the system to particular items of information. For example, a user may desire to generate and display a map that identifies and displays power source support (such as electric, phone, and other support infrastructure), supply or warehousing depots, weather, defined geographic area surrounding an area of user interest, government locations and installations, and detailed installation map.

In response to a user request, the software of the web server 22 queries the central database 40 and connected servers 20 and data sources 30 for data relevant to the request. The system 10 returns the data in data layers so that the information to be displayed using the user interface 12 can be altered by the user, or by the system based upon preselected rules. This feature is particularly important to ensure that the data displayed is not overwhelming in scope and detail. For example, if a user desires to generate a route map and desires the system to retrieve and display all data relevant to the request, the resulting map display would include all roads, all points of interest, and meterologoical conditions, among other things. Any attempt to display such a huge amount of information graphically on a user interface 12, such as displaying of a route map, would result in overload of displayed information on the screen that would make the displayed map illegible. Therefore, the software includes preselected rules to organize relevant data into layers, a limited number of which layers can be toggled on or off by the user, or automatically by the system, to ensure a legible display of data on the user interface 12. The rules may limit the number of types of information displayed at one time, select and group together certain information for simultaneous display, and may change the amount of information displayed depending on a view selected by the user. For example, for a map of a large geographic area, the web server 22 of the system 10 display information concerning only major highways, and does not display minor access roads. As the user zooms in on a narrower geographic area, information concerning smaller roads can be automatically displayed.

Figure 3:
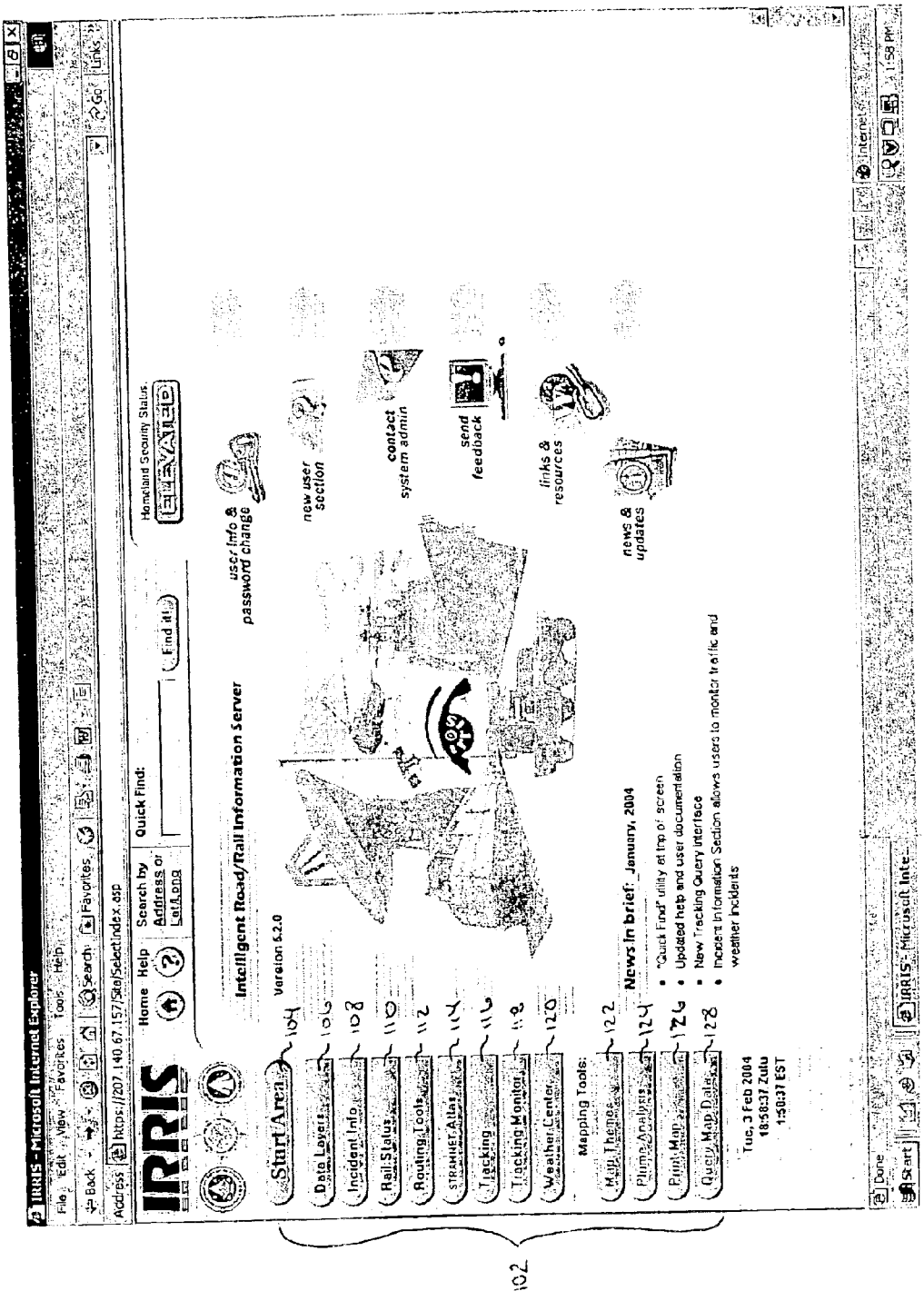
Figure 4:
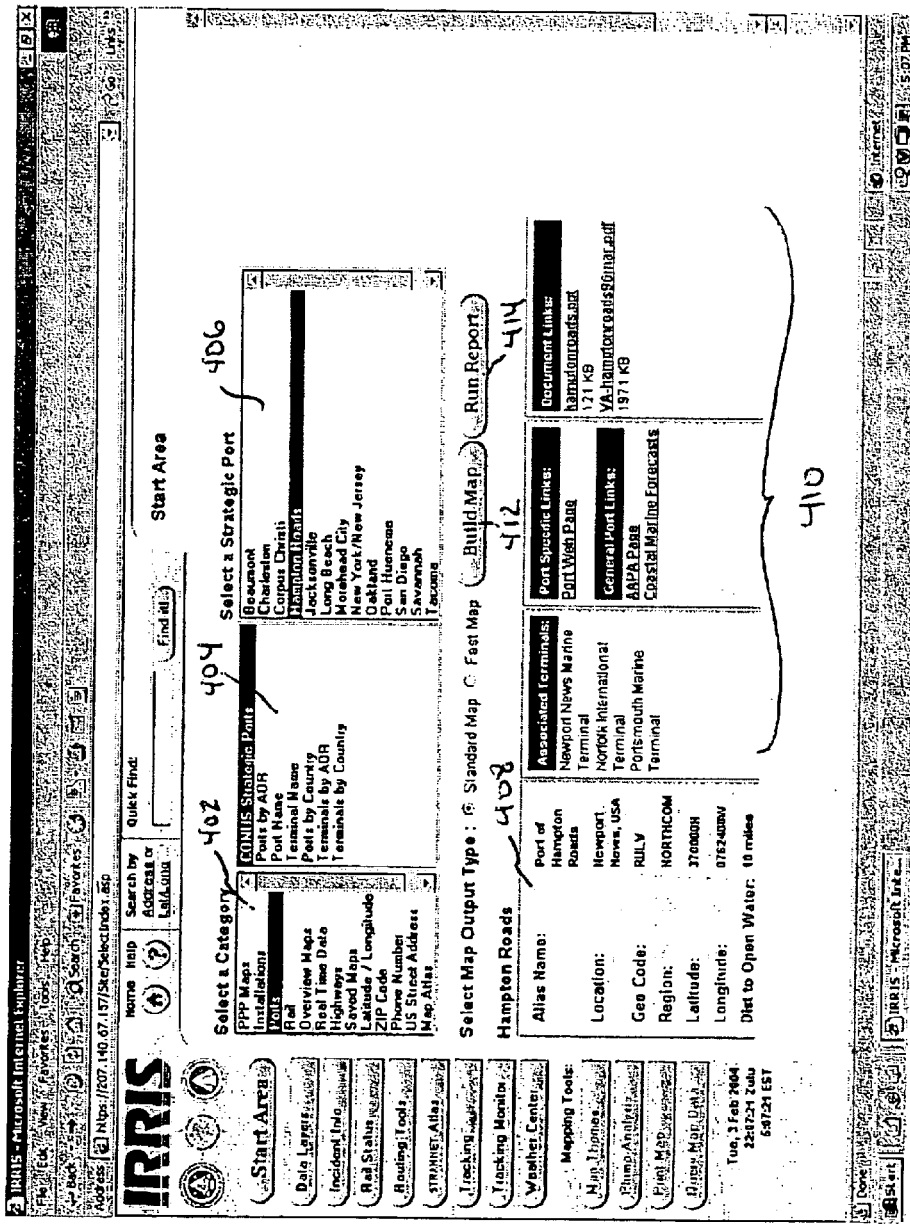
Figure 5:
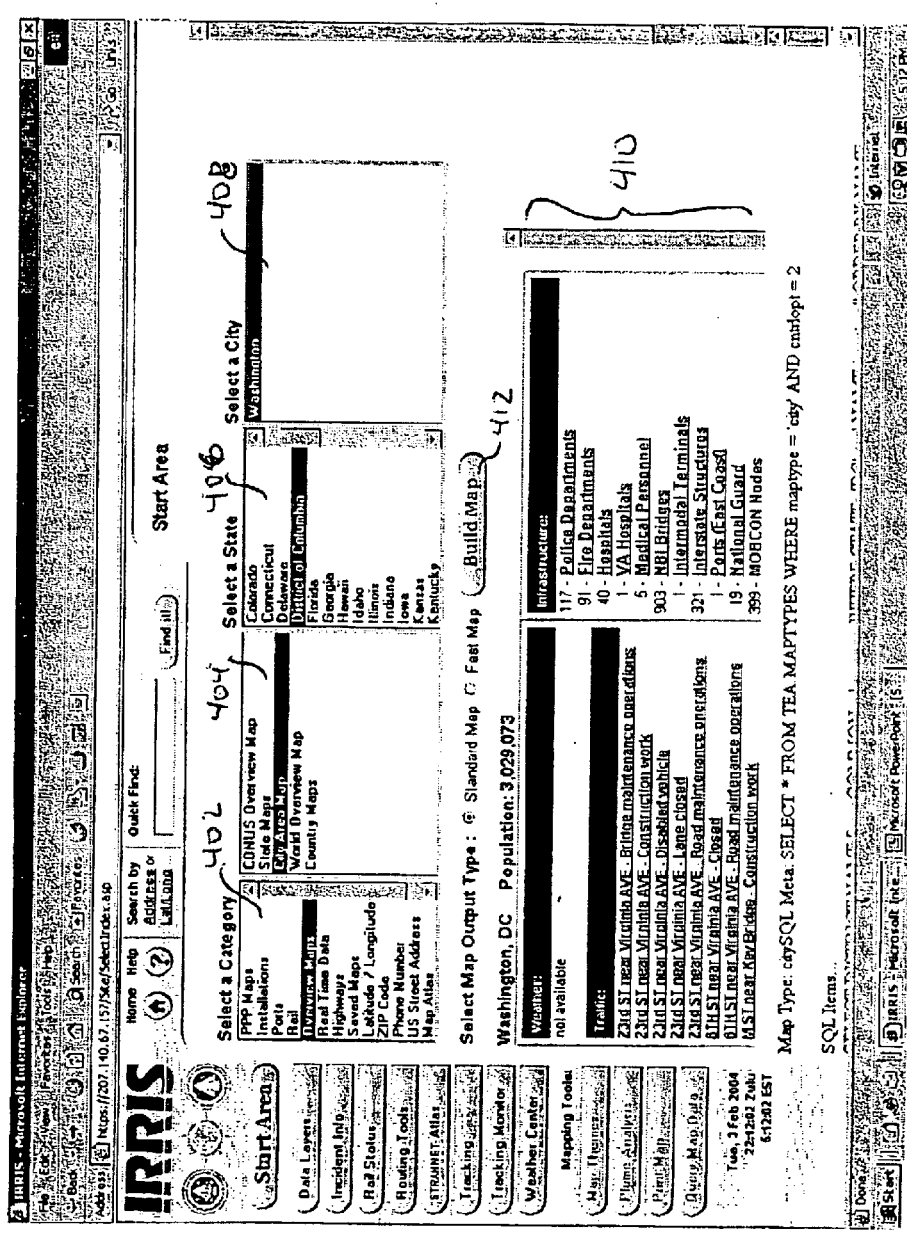

When a user logs into the system 10, after entering passwords or navigating through security screens, a main menu screen 100 is displayed. As shown in FIG. 3, the main menu screen 100 includes a menu of functions 102 that can be selected by a user to commence a series of inquiry screens that will require the user to select from data to build a request. For example, as shown in FIG. 4, clicking on the button for START AREA function 104 will result in generation and display of an inquiry screen 400 requesting the user to select a category from a list of primary options 402. As shown in FIG. 4, moving the cursor over a primary data option 402 in the list results in the generation of a drop down menu of secondary data options 402. Moving the cursor over a secondary option 402 can optionally result in the generation and display of a menu of third data options 404 that relate to the primary 402 and secondary 404 options functions. In the example shown in FIG. 4, the user has selected a primary option 402 of ports, a secondary option 404 of strategic ports, and a tertiary option 406 of the particular port Hampton Roads. The user's initial selections on screen 400 (i.e. simply moving the cursor over the selected options 402, 404, 406) cause the system to immediately display a table 408 of stored data relating to the selected location Hampton Roads, here including any alias, city location, geographic code, region, latitude and longitude and distance to open water. Additionally, the user's initial selections result in immediate display of additional drop-down menus 410 providing links to additional data concerning the user's selected area of study. In the example of FIG. 4, the user's initial selection of the port of Hampton Roads results in immediate display of additional menus 410 listing links to associated terminals, the Hampton Roads internet web page, general port links, and document links to stored documents concerning Hampton Roads. In the example of FIG. 5, the user's initial selection of options, here consisting of an overview map as the primary option selection 402, a city area map as the secondary option 404, and a state as the tertiary option 406 result in display of a quaternary option 408 for selection of a city, here Washington D.C. The user's initial selection of the above options 402, 404, 406, 408 results in the generation of drop-down menus 410 containing data links to weather, traffic, and infrastructure relevant to Washington D.C. In any embodiment, the data links offered in menu 410 are selected by the system in response to the user's selection of options 402, 404, 406, 408, etc.

The user may select any data link from any of the drop down menus 410 to proceed to display data associated with the data link. Optionally, the user my select the Run Report function button 414 to prompt user input screens that guide the user through the process of building sophisticated database queries to view textual data in a tabular format. Using this feature, managers, data analysts, and other administrators are empowered with on-demand access to data to make better business decisions, at Internet speed. The report query builder also enables users to display the results of the query on a map. This mapping functionality enables users to view results in different ways and provides a complete and accurate picture of the data without requiring users to write complex SQL statements. The system 10 thus provides users with visibility for use in life cycle management, for example by providing wholesale item managers with an enhanced, full spectrum asset display made available by including retail, wholesale, reserve and a variety of other asset data not previously brought together in a single application. For military applications, the report concept is similar, but is designed to support current and future warfare operating jointly or as a member of a multi-national coalition. The system 10 supports this type of warfare by integrating logistics and personnel data extracted from the federal services and agencies to provide an integrated, global picture of assets in service, inventories in storage stock piles, and in transit and in process shipments.

Eventually, after reviewing any data links or reports that may be of interest, the user instructs the system 10, such as by clicking ion the Build Map button 412, to gather all data relevant to the area of study. The gathered data is organized into a base map having one or more layers for display on a user interface 12 in communicable connection with the system 10. A user can view the map and each layer as an easy-to-view and intuitive map display, such as on a personal computer monitor or other graphic display linked to a microprocessor.

Figure 6:
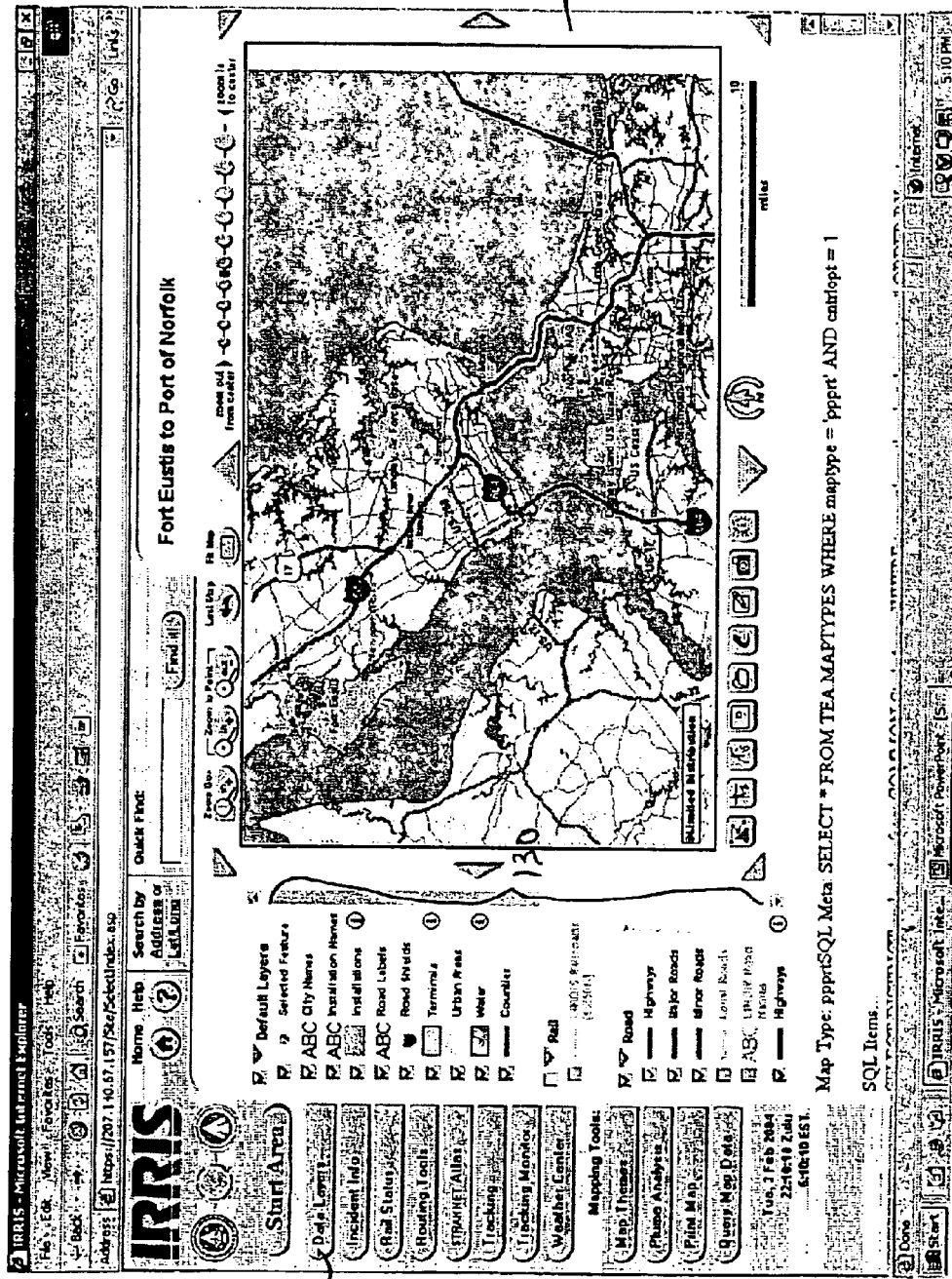

By way of example, a user's area of study may involve accurate routing and driving directions. After the user selects a destination and a starting location, the system 10 processes the request, gathers relevant data from the routing server 29 and other servers 20 to generate a map and accurate and detailed turn-by-turn, address-to-address, or latitude/longitude driving directions with total drive time and mileage. Starting points and destinations are used to calculate routes to and from known points of interest, such as Army, Navy, and Air Force installations, and airports, etc. The system 10 is also capable of calculating driving directions using fastest or shortest route based on a variety of vehicle types (E911, HazMat, Auto, Truck, OSOW), while taking into account real-time (e.g., weather) factors. An exemplary display generated in response to a user request for driving directions is shown in FIG. 6. The display of FIG. 6 is generated in response to a user request for routing information between Fort Eustis and the Port of Norfolk. In this case, the display was created by the user's selection of a primary option 402 of PPP (point to point mapping), secondary option 404 of a starting destination of Fort Eustis, and a tertiary option 404 of the destination of Port of Norfolk in FIG. 5. After clicking the Build Map button, the map display screen 600 is the result.

Figure 7:

As shown in FIG. 7, in response to clicking on the data layers function 106, the software displays layer selection functions 130 that can be toggled on/off by the user at his/her discretion to alter the displayed map by adding or removing layers of particular interest to the user. As shown, the data layers 130 include, but are not limited to, display of city names, installation names, road names and mabels, road shields, terminals, urban areas, water, counties, rail lines, highways, local roads, major roads, minor roads, road names. Additonal exemplary data layers 130 not illustrated include topography, aerial photos, roads and road names, railroads, detailed railways, points of interest, bridges, weather, traffic events, overhead photo, overhead flight, route cameras, national guard, military and governmental nodes, real-time information (such as photographic or video images), video logs, video exits, and vehicle GPS tracking (in-transit visibility). In a preferred embodiment, the layer selection functions 130 have pop-up links to display attribute information for each feature, and are also linked to help screens and "tool tips" to display separate information screens concerning each feature. As further illustrated in FIG. 7, the system 10 includes toolbar features 704 that allow users to edit the map, such as by adding text and symbols 702 on the map to denote an area of interest. The edited map can then be saved, exported, and/or printed by the user, as further described herein.

Figure 8:
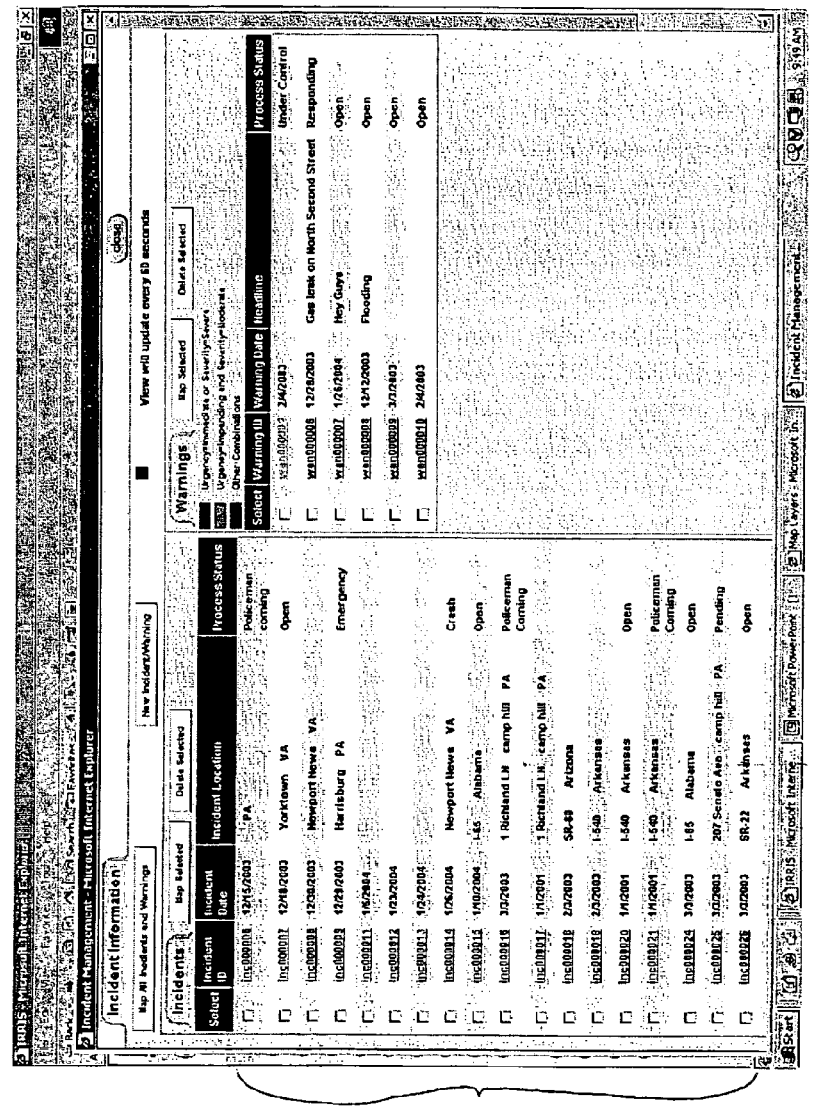
Figure 9:
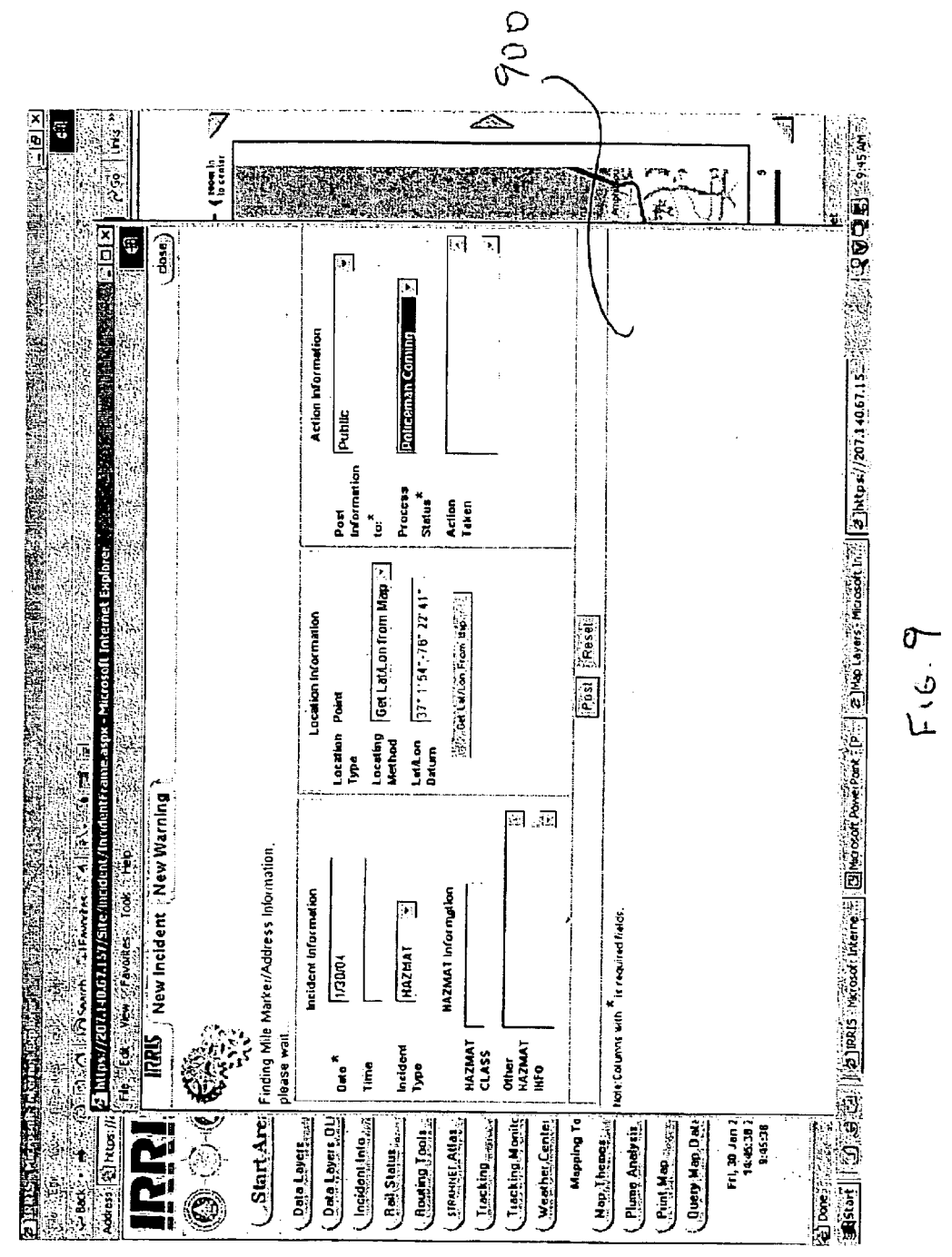
Figure 10:
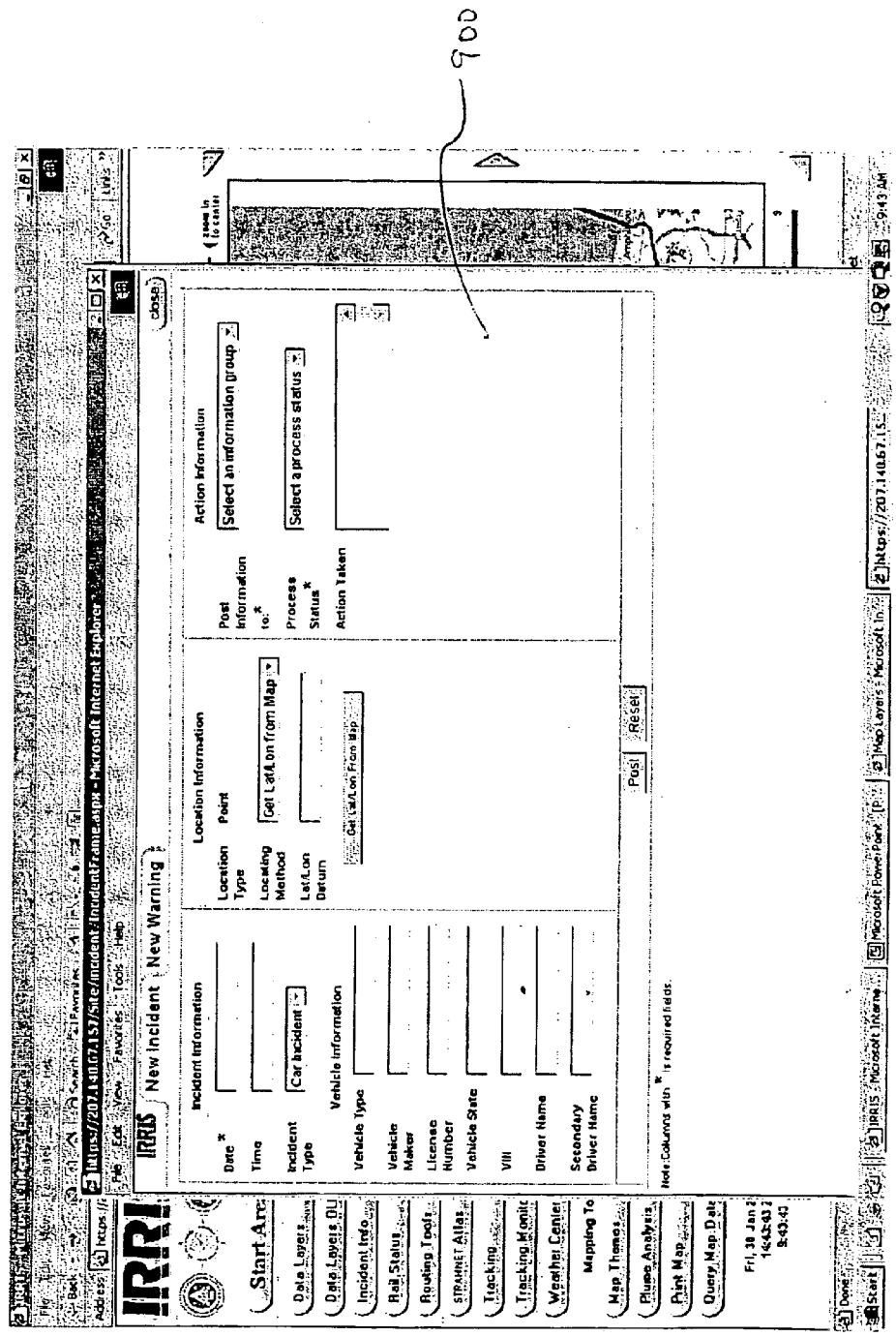

FIG. 8 illustrates an exemplary screen display 800 generated when the Incident Information function 108 is activated by a user. Incidents can include traffic accidents, traffic congestion, road construction, road closures, weather events, and other traffic-related events that affect vehicle travel on roads As shown, the system displays an incident listing 802 that can include all incidents in the system databases, or more preferably include only the incidents relevant to the area of study selected by the user. The incident listing 802 includes information such as the incident identification number assigned by the system 10, the incident date, the incident location, and the status of the incident, such as any emergency response, continuing activities, or expected resolution. The system 10 includes features to allow authorized users to input incidents into the system 10, preferably for storage in the central database 42. FIG. 9 illustrates an exemplary incident input screen for user entry of data relevant to an incident. The system 10 and software-generated screens provide for user input of incident information such as the date, time, and type of incident, including any hazardous material involved in the incident. As shown in FIG. 10, a user's selection of an incident type will determine which, if any, additional input fields are displayed. In the example of FIG. 10, the selection of Car Accident as the incident type results in the display of data input fields for vehicle type, make, license number and state, vehicle identification number, driver name, and secondary driver name. In any case, the additional data fields are generated based upon the incident type, and are designed to elecit the most relevant data for input by a user in order to inform emergency responders, as well as transportation and logistics personnel, of the nature and severity of the incident.

Figure 11:
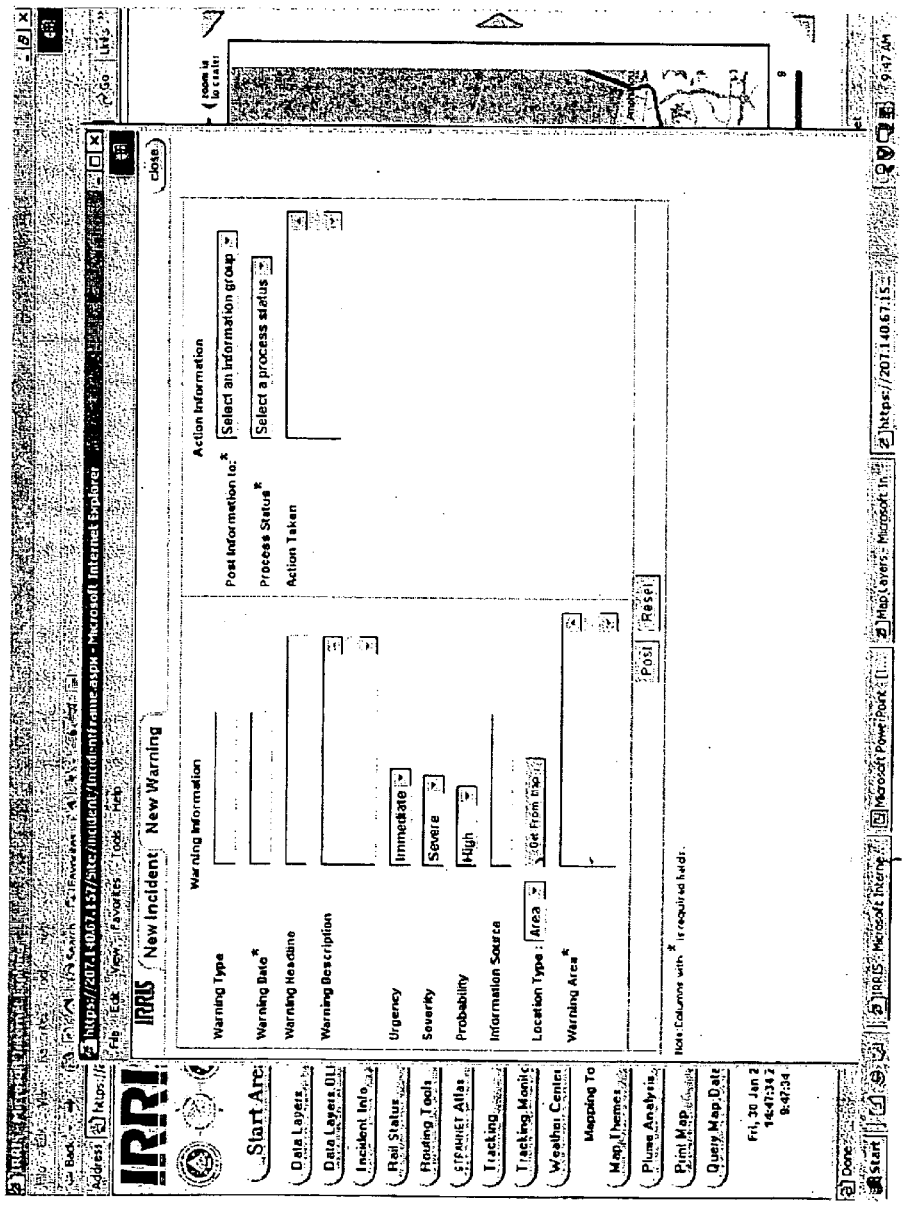

Preferably, the Incident Information function 106 also results in display of warnings 804 relevant to the user's selected area of study. Incidents preferably relate to an event at a specific geographic location, such as a car crash or explosion. By contrast, warnings preferably relate to regional events, such as a weather threat, earthquake, or other regional naturally occurring or man-made threat. However, the system allows overlap between classifying a happening as an incident or a warning without adversely affecting the effectiveness of the system. As shown in FIG. 8, the system displays a warning listing 804 that can include all warnings in the system databases, or more preferably include only the warnings relevant to the area of study selected by the user. The warning listing 804 includes information such as the warning identification number assigned by the system 10, the warning date, a headline, and the status of the warning incident, such as any emergency response, continuing activities, or expected resolution. As shown in FIG. 11, the system and screens provide for user input of warning information such as the type, date and headline for the warning, as well as a text description of the warning, the urgency and severity of the warning, probability of an incident resulting, source of the information that resulted in the warning, and the location of potentially affected area.

Incidents and warnings may be manually entered by users, or may be generated by the system based upon data gathered by the system. For example, if the national weather service issues a tornado warning, the system would automatically generate an incident or warning and link the warning to GIS information for potentially affected geographical areas. The incident and warning features are particularly important for the use of the system for transportation and logistics decisions.

Figure 12:
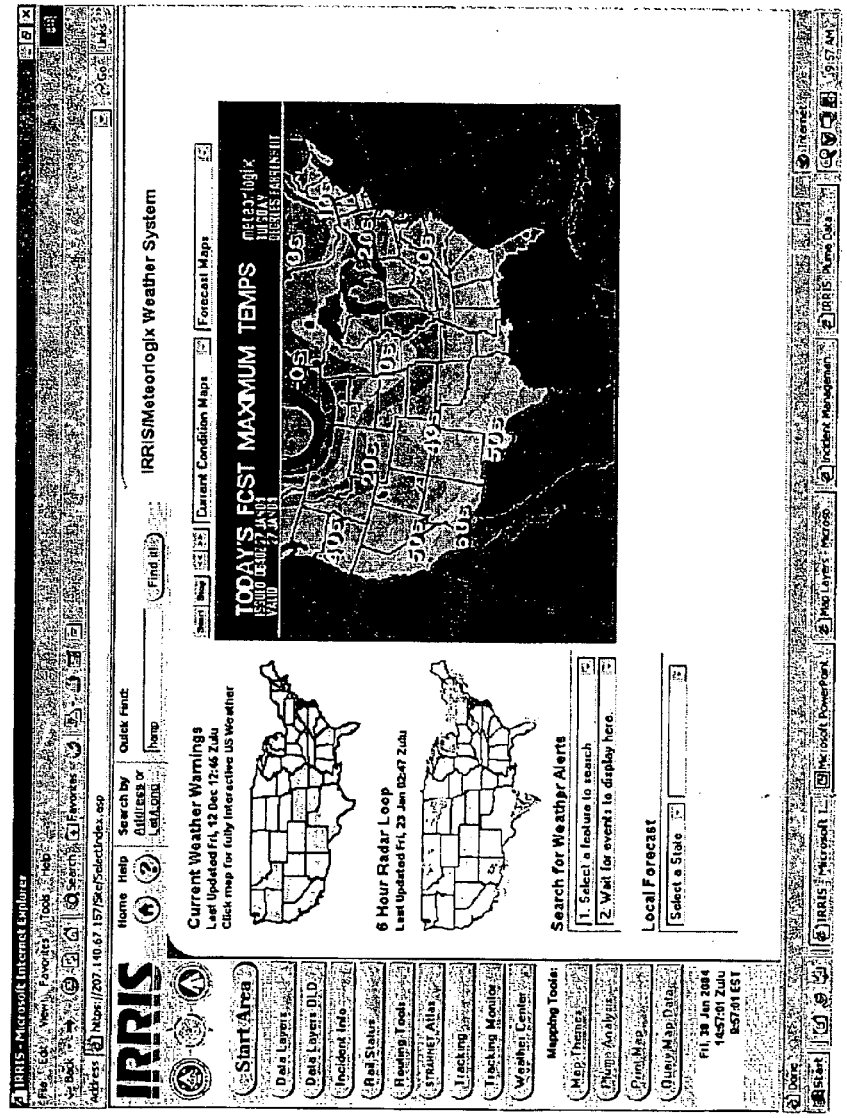

Another feature of the present invention is the generation and display of live weather maps. As shown in FIG. 12, activation of the weather center function 120 prompts the system to generate and display a base map containing accurate, highly local, real-time weather. In one embodiment, highly timely weather data and information is gathered by the system 10, and particularly through the weather server 26, through a dedicated weather subsystem 36 having its own satellite receiver for communication with weather satellites and other real-time weather databases. As shown in FIG. 12, weather data is organized and displayed in an intuitive visual presentation on screens 1200 detailed maps. Preferably, the system 10 gathers weather data not only concerning where a storm is, but also where it is heading. In one example, this is accomplished using Meteorlogix-enhanced NEXRAD radar equipment and information from the National Weather Service to enable predictive data and mapping concerning when a storm will arrive at a given site and just how severe it will be.

Figure 13:
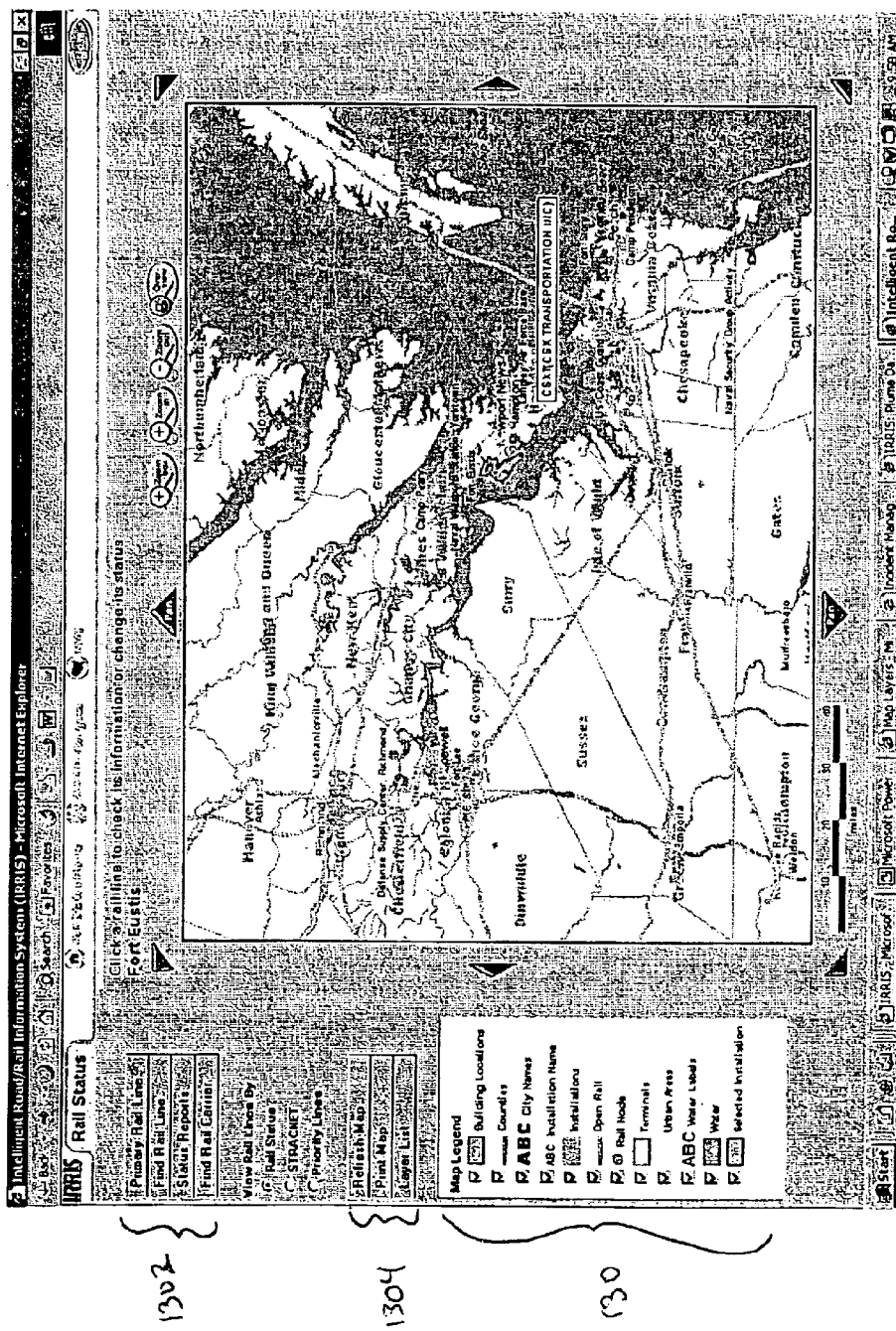
Figure 14:
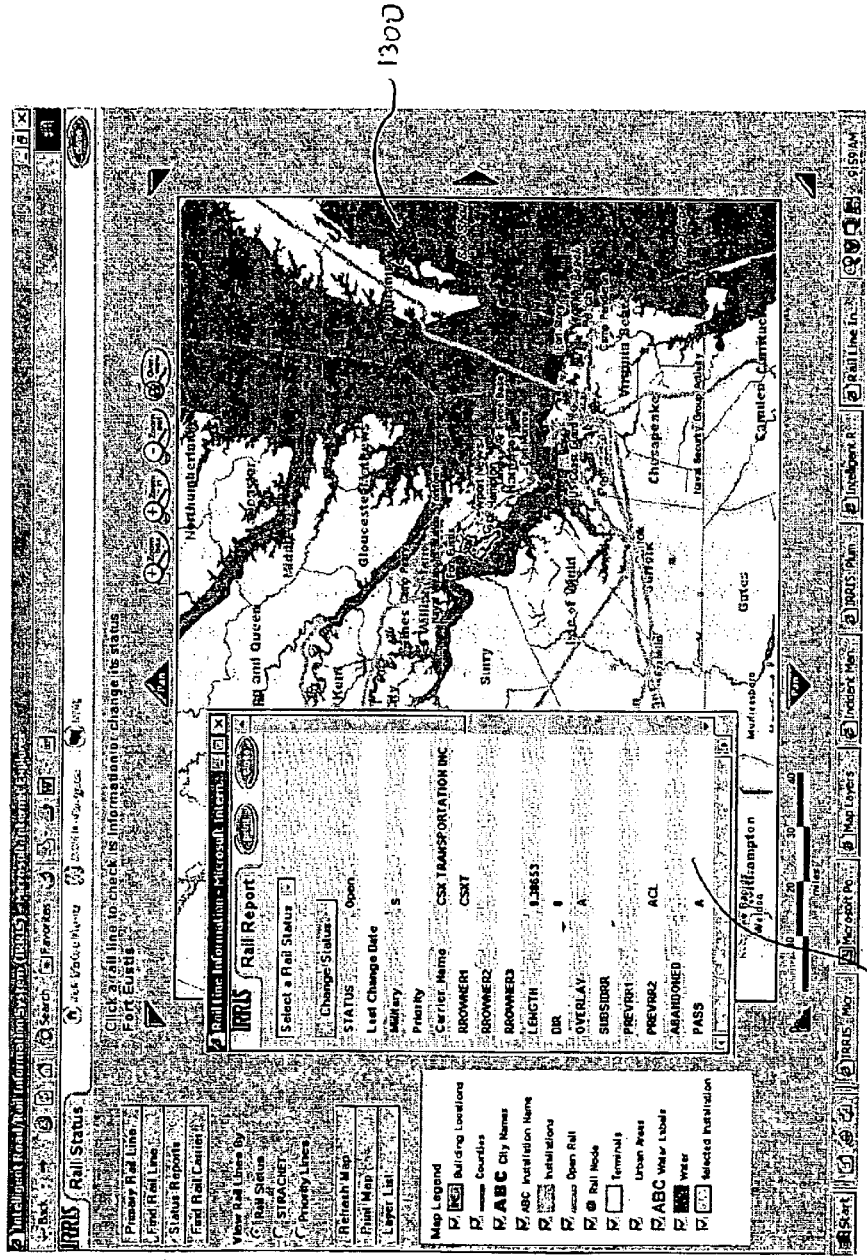

Another feature of the invention involves the ability to access information concerning rail transportation. As shown in FIG. 13, activation of the Rail Status function 110 results in a display of screen 1300 having a base map showing layers for a selected area of study, the layers including rail lines in the geographic area of concern. Additionally, the screen 1300 allows the user to focus on particular data layers, or to gather and display additional rail information, by selecting from primary options 1302. Primary options 1302 may include, for example, focus on primary rail lines, a find function for rail lines, status reports for the indicated rail lines, and a find function for one or more rail carriers. For example, selecting the primary option Primary Rail Line, or alternatively clicking on a displayed rail line, results in the display of a window 1400 containing a table of data 408, in this case relating to the infrastructure and other feature of the selected rail line, as illustrated in FIG. 14. Additionally, viewing options 1304 are provided to allow a user to refresh a map, print the map, and list the data layers available for the area of study and resulting map. Optionally, a layer listing 130 is provided to enable a user to choose the layers that are displayed.

Figure 15:
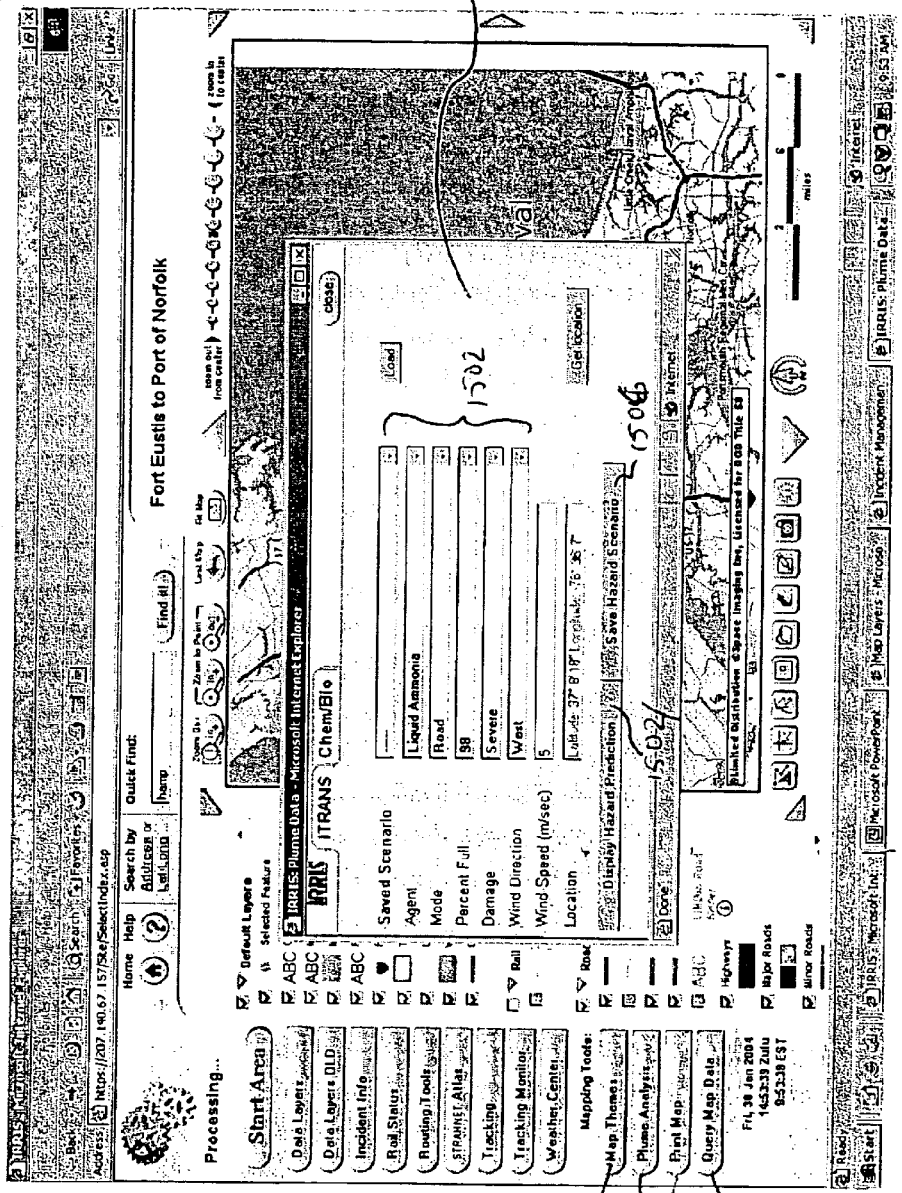
Figure 16:
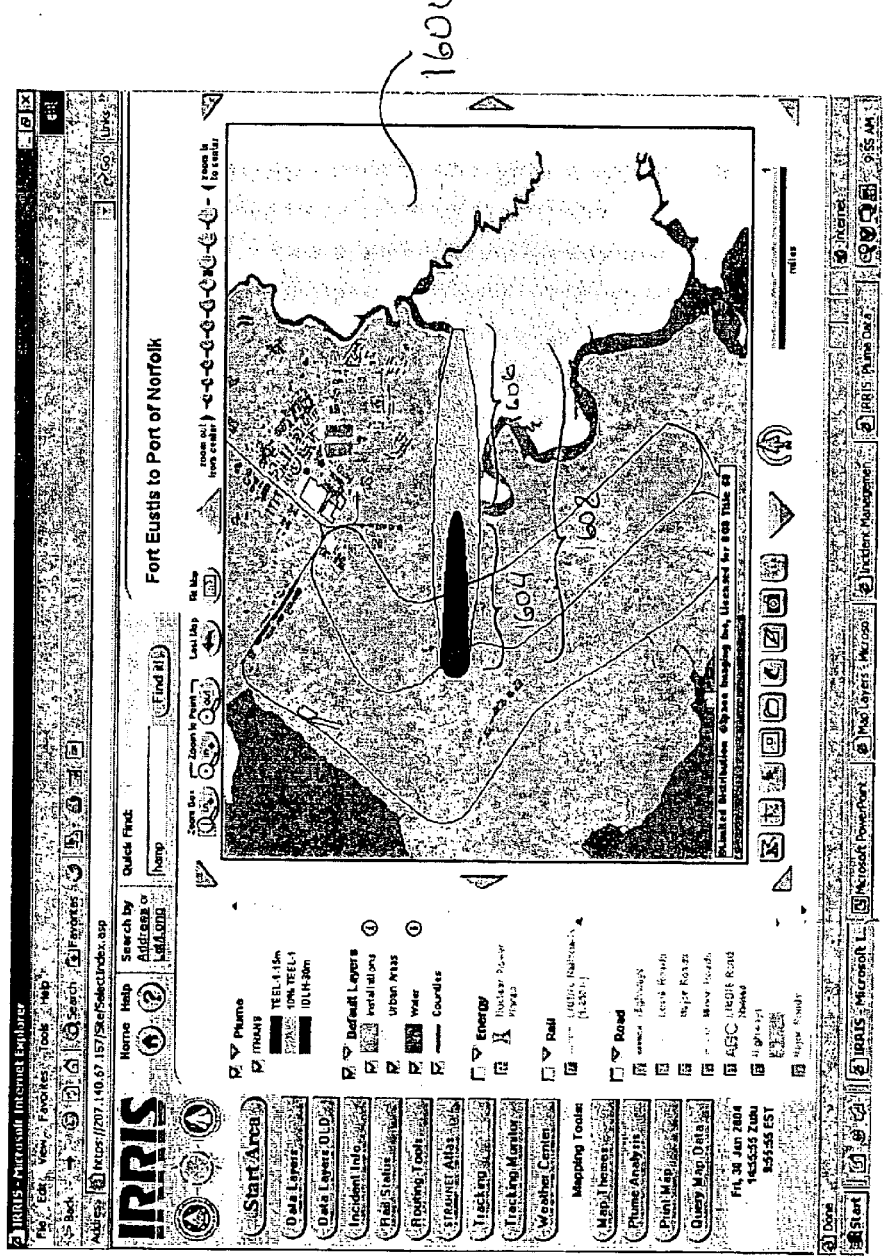

Yet another feature of the system 10 involves mapping tools for predicting and reacting to incidents having a great impact upon transportation and logistics for a particular geographic region. In particular, the Plume Analysis function 124 allows a user to generate a model displaying the expected impact of a man-made or natural disaster on a geographic region and its transportation infrastructure. For example, as illustrated by FIG. 15, activating the Plume Analysis function 124 results in the generation of a data input screen. 1500 that elicits relevant data from an authorized user concerning an incident that may result in a widespread airborne chemical discharge, such as from a chemical storage tank, or from an accident involving a vehicle carrying chemicals or chemical weapons. As shown in FIG. 15, the user input fields 1502 allow a user to select from a listing of chemical agents, travel mode, percent loaded, extent of damage to the vehicle or tank, wind direction and speed, and geographic location. As with any displayed map, the geographic location can be automatically filled in by clicking on the location on the last displayed map, resulting in population of the geographic location field 1502 with the latitude and longitude corresponding to the location selected by the user. When all available information has been entered into the data input fields 1502, the user clicks the Display Hazard Prediction button 1504 to prompt the system 10 to generate a model of the projected chemical contamination or "plume" that is likely to result under the conditions of the discharge. Importantly, the system 10 does not simply rely on the data input by the user, rather it gathers all available relevant GIS and ITS data and information, including but not limited to real-time weather and topography to model the environmental impact of the chemical discharge or other selected incident. As shown in FIG. 16, the resulting display is a map that includes data layers that represent the contaminated area 1602, preferably indicating areas of higher chemical contamination concentration 1604 in a first color, and areas of lesser chemical contamination concentration 1606 in at least one other color. As in other displays generated by the invention 10, the system allows the user to display the map layer listing 130, and to toggle one or more layers on or off to obtain a displayed map showing the data most relevant to the incident and to the user.

Another feature of the system 10 is the ability to export the map displays to a user interface 12, so that the interface 12 can store the maps, including the data layers and any user edits. This feature presents users with portable, multi-layered data displays and the ability to display or print particular maps having selected data layers. There is no requirement that the user interface 12 have proprietary software—all that is required is an Internet browser. Map data can be exported to ESRI shape file, MapInfo, or AutoCAD data formats. This map export feature is preferably activated under the Print Map function 126, and requires the user to select the particular data layers to be exported. After selecting desired layers, the user initiates an export routine that allows individual export files to be downloaded from the system to a user interface.

Yet another feature of the system 10 is the generation and display of live traffic and incident data relating to traffic and road systems. The system 10 provides access to the most extensive and complete real-time traffic information through a Web-based interface. In one embodiment, users are able to view live route cameras, fly-throughs, video exits, as well as detailed traffic incidents, construction, and event data for various metropolitan areas within the continental United States. However, as additional live feed equipment is deployed, the system can receive additional data feeds without departing from the scope of the invention. Additionally, the system includes predictive features for transportation and logistics based upon historic data such as traffic congestion on particular days and times of day, detour impacts, and the like.

The system further includes remote access features to allow users to obtain information about road conditions, construction, incidents, and weather while on the road. Using wireless interfaces 12, such as WAP-enabled phones, PDAs, and other wireless communications interfaces, users can access the system 10 from remote locations, including in-transit access from vehicles en route. The system 10 allows user to retrieve and display detailed maps, as well as tables of GIS data and information concerning road and weather conditions, incident, alerts and warnings about real-time conditions ahead, and driving directions. For users who need data but are in locations that do not support large bandwidth transmissions, or for users whose interfaces 12 do not support large bandwidth transmissions, a low bandwidth embodiment version of the system 10 is provided. The low-bandwidth embodiment preferably utilizes selective data gathering and display technology such as data compression, low-resolution graphics, text-only messages, intelligent chunking (sending no data that a user does not need), and/or use of thumbnails. Additional features, such as intelligent user interfacing can help to avoid surprises such as a half hour delay to download a document in low-bandwidth conditions. The system 10 preferably warns a user when a displayed or selected link will lead to very large files that cannot be efficiently handles in low-bandwidth mode. The system 10 also includes and uses data compression technology schemes to reduce the size of files, and thus to reduce the time they take to transfer over the network to the user interface 12. For example, many known data formats have internal compression schemes for some or all of the data, including GIF and JPEG image file formats, as well as some TIFF image file formats.

The system of the present invention combines technologies and data from military, local, state and federal governments, and commercial sources. For example, in one embodiment of the system 10, Navigation Technologies, Inc. (NavTech) provides the accurate road centerlines necessary for routing and tracking, while Meteorlogix serves as the data provider for a real-time weather data feed. By way of non-limiting example, the system can interface with other systems and databases, including Department of Defense systems, Defense Transportation Tracking System (DTTS), Global Freight Management (GFM), Global Transportation Network (GTN), United States Munitions List (USML), Defense Threat Reduction Agency (DTRA), Integrated Booking System—Commercial Sealift Solution (IBS-CSS), Intellitrans Rail Tracking, Commercial Carriers, APL Logistics, Federal Express, Lykes, Maersk SeaLand, Commercial Tracking Systems, Qualcomm, Seimac, Global Data Solutions, the National Highway Planning Network (NHPN), United Stated Geological Survey (USGS), Federal Rail Administration (FRA), DTRA, NavTech, National Bridge Inventory (NBI), and Digital Charts of the World (DCW), and other data sources having data relating to transportation and logistics.

As a result of its many data sources, the system 10, using the tracking subsystem, can provide real-time in-transit visibility of vehicles and shipments. In one embodiment, the system 10 provides an integrated data environment to allow emergency management decision makers to access necessary and relevant databases to track and report arms, ammunition, and explosives, and freight of all kinds of shipments over a spatially accurate mapping background. Convoys or commercial and emergency response vehicles can also be tracked, including their inventories based upon bill of lading information correlated to each vehicle by the system 10.

The system 10 is easy to use, and requires no user training, nor any proprietary software installation on user interfaces 12. Because IRRIS leverages existing data sources and merges the gathered data into a single web-based interface tool that displays maps and information that can be easily selected and controlled by the user, it provides a truly global information system. For example, a commercial OSE (open system environment) embodiment utilizes a combination of data warehousing and data reach-back techniques in concert with two types of servers: regional and global. Use of dual mode servers continues to be necessary while and until mediation technologies mature to the extent that probing these disparate databases will return data in to an integrated view. However, upon maturation of mediation technologies, a single server can suffice.

The system 10 further includes security features to prevent unauthorized use. For example, users are validated to access the software, and for particular preselected applications therein, using user IDs and passwords. Other security enhancements such as Public Key Infrastructure (PKI), MLS, and other means known to those skilled in the art can be incorporated to enhance security. Security is particularly important with respect to the OSE embodiment of IRRIS, which provides reach-back access to global information to enhance timeliness of data available in response to a user's request. Therefore, the system and server architecture and development to support the system 10 contemplates network security engineering to ensure compatibility with evolving computer software and hardware security technology.

The system 10 of the invention also includes a novel tracking subsystem that allows real-time tracking of vehicles and shipments against an accurate spatial background, and display of map-like graphics to allow users to view and select particular tracked items to obtain additional status information. In particular, the tracking subsystem allows users to: accurately monitor and track the location of freight traffic and vehicles on a graphic map display in real-time; cross-reference location information with the bill of lading (BoL) information; and effectively and easily query both the raw location and BoL data, and display the results in tabular and mapped formats. In a simple embodiment, the IRRIS tracking subsystem receives two main sources of information about tracked vehicles: location information, and BoL information from a shipping or dispatching database. The system enables its users to correlate these two pieces of information, display the results in an informative and visual manner, and effectively query and report on these data sets.

By way of example, the tracking features are described herein in the context of a first military-oriented embodiment. However, the features are equally novel and valuable as applied in a commercial logistics and transportation endeavors. The sources of data in Table 1 are used in a first embodiment of the tracking subsystem:

TABLE 1

IRRIS Tracking Subsystem Data Sources

| | |
|---|---|
| Vehicle Tracking Vendor (Qualcomm) | QUALCOMM will provide the communications infrastructure (satellites, NMCs, tracking devices, etc.) for the IRRIS tracking subsystem. This includes, among other data, freight GPS locational information (latitude, longitude, bearing, speed), as well as messaging data. |
| Shipper 1 (DSS) | Shipper 1 database contains Bill of Lading information for Shipper 1 |
| Shipper 2 (CMOS) | Shipper 2 database contains the Bill of Lading information for Shipper 2. |
| (Optional) Intermediary (GFM) | Intermediary receives ALL Bills of Lading from Shipper 1 and Shipper 2 |
| GIS infrastructure vendor (NavTech) | The GIS infrastructure database, preferably provided by NavTech, includes street level line, and polygon mapping data. The database also contains POI information, which are used through out the application. |

Figure 17:
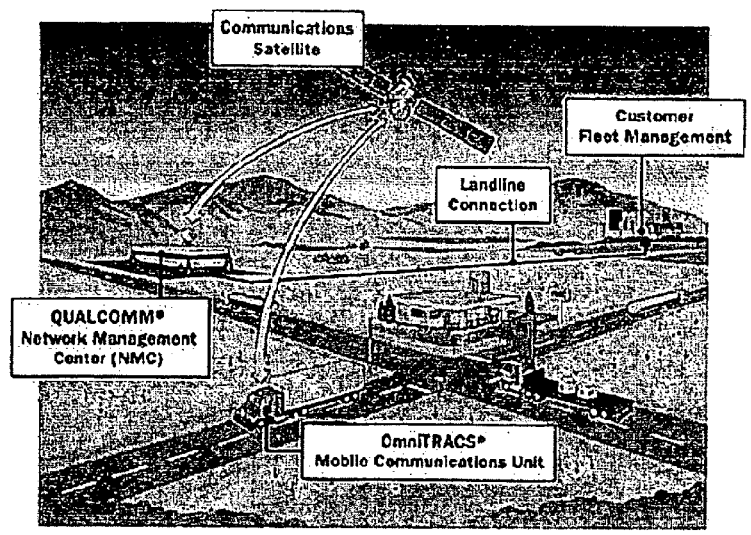
FIGS. 17–21 illustrate architecture and data flow in accordance with one embodiment of the tracking subsystem of the present invention.

In the first embodiment, the server side system for obtaining vehicle locational information is provided by a satellite-enabled tracking system, wherein the vehicles use mobile communication devices to communicate by satellite with a central monitoring station. In the preferred embodiment, the locational information is provided by a vehicle tracking vendor such as QUALCOMM. QUALCOMM is a larges mobile data solutions provider that processes million of messages a day in its Network Management Center (NMC). FIG. 17 illustrates an example of the vehicle tracking architecture of a QUALCOMM system compatible with use in the tracking subsystem of the present invention.

Tracked vehicles will use mobile communications units to send the vehicle's location, and possibly other data and messages through the QUALCOMM communications satellite to a QUALCOMM Network Management Center (NMC). This information is then forwarded to the tracking subsystem through a landline. The vehicle information is then combined with the bill of lading information received from GFM or another shipping information system, and is stored in a data store. This combination allows system users to conveniently view the freight location information as well as the lading details for the freight, in an easy to use graphical interface. Similarly, data and messages from the system 10 are also transferred from the tracking subsystem to QUALCOMM's Network Management Center (NMC) via landline, and then sent to the vehicle via the communications satellite. Thus, two-way communication is accomplished by the system 10.

With respect to bill of lading (BoL) data flow, the shipping entity, in the first embodiment, the military Traffic Management Command (MTMC) is responsible maintaining BoL records, and transmitting information relating to the records to the system 10. The BoL records serve four main purposes: provide freight details; act as a receipt; serve as evidence of contract carriage; and serve as a document of title for the goods in the shipment. To meet the requirements of the tracking subsystem, the shipper's system sends all shipping transactions to the system 10. Certain transactions will be sent in near real time (such as by batching every 10 minutes), while BoL information for less important or time-sensitive shipments may be batched and sent less frequently to the system 10.

Figure 18:
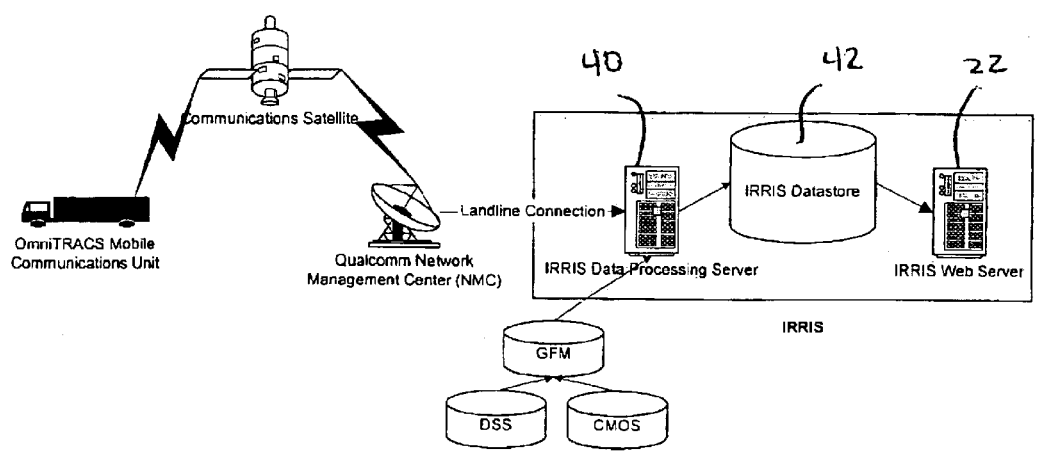

The mission of the tracking subsystem is to provide decision-makers with critical information necessary to monitor and query current state of freight traffic, and make informed decisions about rapid and efficient deployment of such freight. As such, the system acts as a central repository of pertinent information in order to provide its users with up to date, and accurate information. Accordingly, FIG. 18 generally illustrates the architecture of the IRRIS tracking subsystem.

Figure 19:
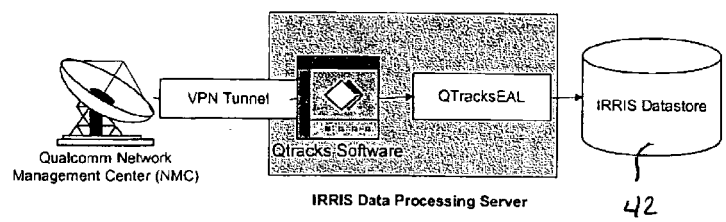
Figure 20:
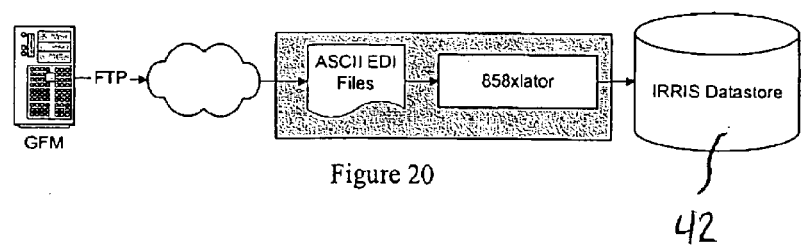

As illustrated in FIG. 19, the QUALCOMM locational information is preferably received through a VPN connection between the IRRIS data processing server, and the QUALCOMM NMC. The QUALCOMM Qtracks application, which preferably resides on the central database 40 of the system 10, is responsible for establishing and maintaining this connection, and also receiving the locational data from the QUALCOMM NMC. As further illustrated in FIG. 20, once the appropriate data packets are received, Qtracks launches a custom software application called QTracksEAL that is responsible for parsing the received packets, and placing them into the central database 42 of the system 10. QTracksEAL preferably also resides on the central database server 40 of the system 10. The BoL datasets are pushed to the data processing server 40 from QUALCOMM NMC via a landline FTP connection. The pushed data is in ASCII EDI format. A software application residing on the central database server 40 of the system 10 then parses the ASCII files, and places the data into the central database 42.

Figure 21:
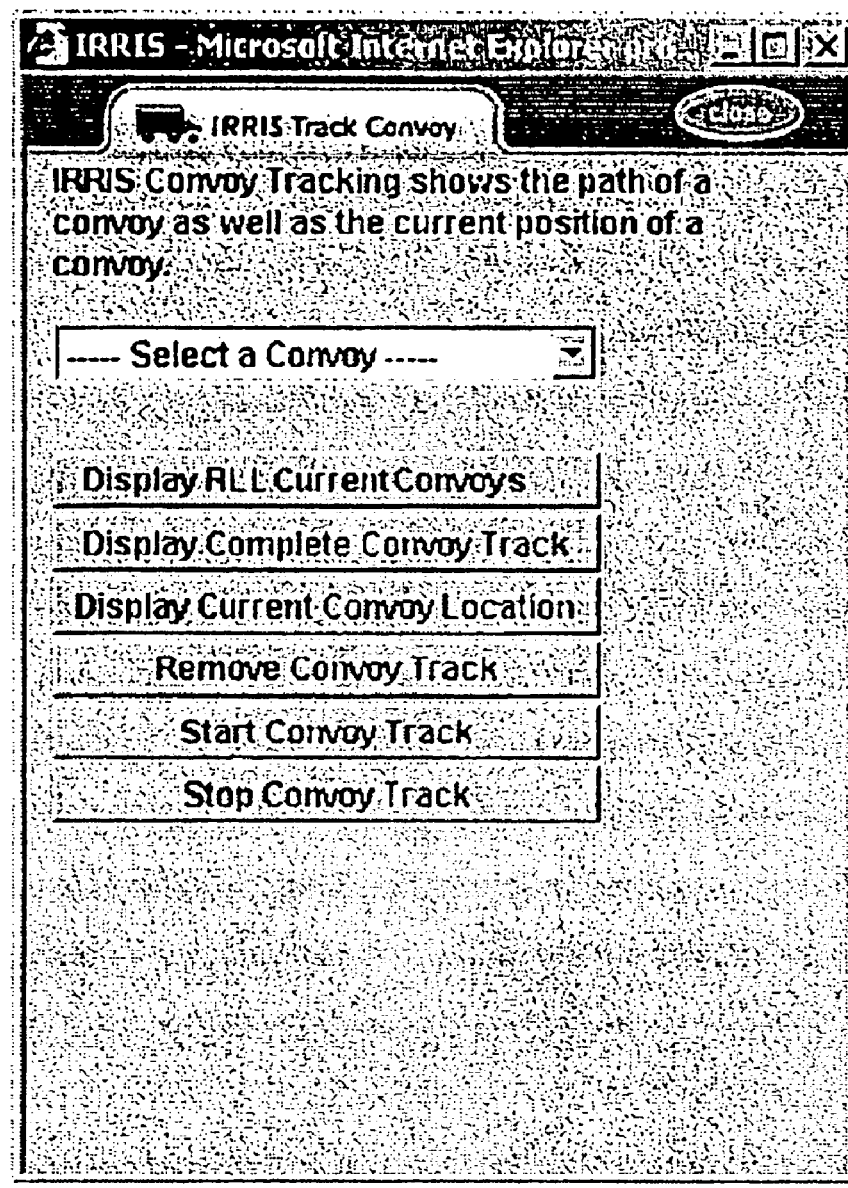

The tracking subsystem provides for access using a user interface 12 that is consistent with the feature previously described for the map-like function of the system. Preferably, access to the tracking features is provided by clicking on an icon or button provided on the main screen 100. In a preferred embodiment illustrated in FIG. 21, a "Select Convoy" screen 2100 is provided upon access to the tracking subsystem, the screen 2100 having data selection options 2102 to enable users to pick a vehicle or convoy for tracking on a map. Preferably, the options 2102 allow the option to pick one convoy or pick amongst all the current shipments. Once a convoy or vehicle is selected, the system processes the request and gathers relevant data from the system 10, and generates a base map display that illustrates the current location of the convoy on a map. Preferably, the current location will show up as an icon on a map, and can be highlighted. Users are then able to click on the icon to instruct the system to display the BoL record for shipments affiliated with the vehicle or convoy. In a preferred embodiment, the following options are also presented for displaying additional relevant information contained in data layers underlying the displayed base map:

Display Current Convoy Location: option that displays the current location, but not the previous track or route.

Display all Current Convoys: option that displays the current location of all convoys.

Remove Convoy Track: option that removes the convoy trail from the map.

Start Convoy Track: option that refreshes the map every 45 seconds to display the current location of the convoy on the map as it travels.

Stop Convoy Track: option that stops the refreshing of the map.

While the IRRIS embodiments described herein represent the preferred embodiments and disclose the best known mode of the methods and system of the invention contemplated by the inventors as of this filing, it is not the only embodiment contemplated. Commercial embodiments are also contemplated hereunder. Accordingly, while the invention has been described with reference to a preferred governmental embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A transportation decision support system for requesting, processing, and displaying transportation information and tracking information concerning surface transport of goods and personnel, the system comprising:

at least one server, the at least one server having a microprocessor and a memory storing computer program executable by the microprocessor, the computer program comprising computer instructions for presenting a web-based interface for soliciting a user request for transportation information, receiving the user request, gathering transportation information relating to the user request from transportation data sources communicably connected to the server, organizing the gathered transportation information into data layers, and displaying the data layers as a base map having data layers that can be selected and adjusted by a user to alter the displayed base map;

a tracking application residing on the at least one server, the tracking application comprising computer instructions for presenting a web-based interface for soliciting a user request for tracking information relating to an in-transit shipment, gathering vehicle location information and bill of lading information from at least one logistic data source communicably connected to the server, correlating the vehicle location information and bill of lading information, organizing the correlated information into data layers, and displaying the data layers as a base map having data layers that can be selected and adjusted by a user to alter the displayed base map; and at least one client user interface in communication with the at least one server, the at least one client user interface being configured to display the base maps and data layers and to permit a user to select and adjust the displayed base maps and data layers.

2. The system of claim 1, wherein the transportation information is at least one of routes, maps, transportation infrastructure characteristics, real-time traffic, real-time weather, fixed images, video images, incidents, and warnings.

3. The system of claim 2, wherein transportation data sources are at least one of cameras, speed sensors, radar, automated construction and accident reporting systems.

4. The system of claim 3, wherein the incidents include traffic accidents, traffic congestion, road construction, road closures, weather events, and other traffic-related events that affect vehicle travel on roads.

5. The system of claim 4, wherein the system further includes means for automatically generating incidents in response to gathered transportation information.

6. The system of claim 4, wherein the system further includes means for permitting users to manually enter incidents into the system using the user interface.

7. The system of claim 4, wherein the tracking information is one of shipment inventory, shipment origination location, current shipment location, shipment destination, planned shipping route, altered shipping route, alternate shipment routes, portion of shipping route completed, portion of shipping route not yet completed, vehicle type, and estimated time of arrival.

8. The system of claim 7, wherein the logistic data source is at least one of commercial shipping databases, commercial inventory databases, military shipping databases, and military inventory databases.

9. The system of claim 8, wherein the at least one client interface is in communication with the at least one server using wireless means.

10. The system of claim 8, wherein the system further comprises means for permitting a user to input transportation data into the user interface, and to and transmit the input transportation data to the at least one server.

11. The system of claim 9, wherein the client interface further comprises means for permitting a user to input vehicle location information and bill of lading information into the user interface and to transmit the input data to the at least one server.

12. The system of claim 8, wherein the system further comprises means for predicting and reacting to incidents having a significant impact upon transportation and logistics for a particular geographic region.

13. The system of claim 12, wherein the means for predicting and reacting to incidents includes a plume analysis function that generates a predictive model display showing the expected impact of a man-made or natural disaster on a geographic region and its transportation infrastructure based upon geographic and meteorological information relating to the particular geographic region.

14. A method of providing transportation and tracking information to a user, the method comprising the steps of:

provides a transportation decision support system for requesting, processing, and displaying transportation information and tracking information concerning surface transport of goods and personnel, the system comprising:

at least one server, the at least one server having a microprocessor and a memory storing computer program executable by the microprocessor, the computer program comprising computer instructions for presenting a web-based interface for soliciting a user request for transportation information, receiving the user request, gathering transportation information relating to the user request from transportation data sources communicably connected to the server, organizing the gathered transportation information into data layers, and displaying the data layers as a base map having data layers that can be selected and adjusted by a user to alter the displayed base map;

a tracking application residing on the at least one server, the tracking application comprising computer instructions for presenting a web-based interface for soliciting a user request for tracking information relating to in-transit shipments, gathering vehicle location information and bill of lading information from at least one logistic data source communicably connected to the server, correlating the vehicle location information and bill of lading information, organizing the correlated information into data layers, and displaying the data layers as a base map having data layers that can be selected and adjusted by a user to alter the displayed base map; and at least one client user interface in communication with the at least one server, the at least one client user interface being configured to display the base maps and data layers and to permit a user to select and adjust the displayed base maps and data layers;

presenting a web-based interface for soliciting a user request for transportation information;

receiving the user request;

gathering transportation information relating to the user request from at least one transportation data source communicably connected to the server;

organizing the gathered transportation information into data layers, and displaying the data layers as a base map having data layers that can be selected and adjusted by a user to alter the displayed base map.

15. The method of claim 14, wherein the step of displaying further includes the step of transmitting the data layers to a remotely located user interface.

16. The method of claim 15, wherein the step of transmitting is accomplished by wireless means.

17. The method of claim 14, further comprising the steps of:

presenting a web-based interface for soliciting a user request for tracking information relating to in-transit shipments;

gathering vehicle location information and bill of lading information from at least one logistic data source communicably connected to the server;

correlating the vehicle location information and bill of lading information;

organizing the correlated information into data layers, and displaying the data layers as a base map having data layers that can be selected and adjusted by a user to alter the displayed base map.

18. The method of claim 17, wherein the step of displaying further includes the step of transmitting the data layers to the remotely located user interface.

19. The method of claim 18, wherein the step of transmitting is accomplished by wireless means.

20. The method of claim 19, further comprised of the steps of permitting a user to input transportation data and logistics data into the user interface, and transmitting the input transportation data to the at least one server.

21. The method of claim 20, wherein the input transportation data and logistics data relates to at least one incident having a potentially significant impact upon transportation and logistics for a particular geographic region.

22. The method of claim 21, wherein the system further includes means for predicting and reacting to input transportation data and input logistics data, the means including a plume analysis function that generates a predictive model display showing the expected impact of a man-made or natural disaster on a geographic region and its transportation infrastructure based upon the input transportation data and geographic and meteorological information relating to the particular geographic region.

* * * * *

UNITED STATES PATENT AND TRADEMARK OFFICE
CERTIFICATE OF CORRECTION

PATENT NO.    : 6,871,137 B2
DATED         : February 5, 2004
INVENTOR(S)   : Scaer et al.

It is certified that error appears in the above-identified patent and that said Letters Patent is hereby corrected as shown below:

<u>Column 7,</u>
Line 7, "ED1214" should be -- EDl214 --.
Line 8, "ED1858" should be -- EDl858 --.

<u>Column 12,</u>
Line 60, "screen.1500" should be -- screen 1500 --.

Signed and Sealed this

Eighth Day of November, 2005

JON W. DUDAS
*Director of the United States Patent and Trademark Office*